United States Patent
Fan et al.

(10) Patent No.: US 11,252,620 B2
(45) Date of Patent: Feb. 15, 2022

(54) WIRELESS DEVICE, RADIO NETWORK NODE, AND METHODS PERFORMED THEREIN FOR COMMUNICATING IN A WIRELESS COMMUNICATION NETWORK

(71) Applicant: TELEFONAKTIEBOLAGET LM ERICSSON (PUBL), Stockholm (SE)

(72) Inventors: Rui Fan, Beijing (CN); Icaro L. J. Da Silva, Solna (SE); Janne Peisa, Espoo (FI); Pradeepa Ramachandra, Linköping (SE)

(73) Assignee: Telefonaktiebolaget Ericsson LM (publ), Stockholm (SE)

(*) Notice: Subject to any disclaimer, the term of this patent is extended or adjusted under 35 U.S.C. 154(b) by 0 days.

(21) Appl. No.: 16/607,659

(22) PCT Filed: May 3, 2018

(86) PCT No.: PCT/SE2018/050458
§ 371 (c)(1),
(2) Date: Oct. 23, 2019

(87) PCT Pub. No.: WO2018/203816
PCT Pub. Date: Nov. 8, 2018

(65) Prior Publication Data
US 2020/0305041 A1 Sep. 24, 2020

Related U.S. Application Data

(60) Provisional application No. 62/501,812, filed on May 5, 2017.

(51) Int. Cl.
*H04W 36/06* (2009.01)
*H04B 7/06* (2006.01)
(Continued)

(52) U.S. Cl.
CPC .......... *H04W 36/06* (2013.01); *H04B 7/0617* (2013.01); *H04B 7/088* (2013.01);
(Continued)

(58) Field of Classification Search
CPC . H04W 36/06; H04W 36/30; H04W 36/0061; H04W 72/046
See application file for complete search history.

(56) References Cited

U.S. PATENT DOCUMENTS

2012/0182895 A1 7/2012 Jwa
2015/0222345 A1* 8/2015 Chapman ............. H04B 7/0632
370/332
(Continued)

FOREIGN PATENT DOCUMENTS

CN 103220704 A 7/2013
CN 103220740 A 7/2013
(Continued)

OTHER PUBLICATIONS

3GPP TSG-RAN WG2 Meeting #97, Beam Related Measurement Report and Inter-cell HO in NR, CPEL 1952681P, R2-1701921, Greece, Feb. 13-17, 2017.
(Continued)

*Primary Examiner* — Min Jung
(74) *Attorney, Agent, or Firm* — Ericsson Inc.

(57) ABSTRACT

Some embodiments herein relate to a method performed by a wireless device (10) for handling communication of the wireless device (10) in a wireless communication network (1), wherein a first radio network node serves the wireless device (10) and the wireless communication network (1) further comprises a second radio network node (13). The wireless device receives a handover command from the first radio network node (12) indicating a handover to a cell served by the second radio network node (13), the handover
(Continued)

command comprises a beam indication, such as a threshold, controlling which beam of the cell to select by the wireless device (10). The wireless device (10) further selects a beam of the cell based on at least the beam indication.

13 Claims, 19 Drawing Sheets

(51) Int. Cl.
*H04B 7/08* (2006.01)
*H04W 36/30* (2009.01)
*H04W 72/04* (2009.01)
*H04W 74/02* (2009.01)
*H04W 74/08* (2009.01)

(52) U.S. Cl.
CPC ......... *H04W 36/30* (2013.01); *H04W 72/046* (2013.01); *H04W 74/02* (2013.01); *H04W 74/0833* (2013.01)

(56) References Cited

U.S. PATENT DOCUMENTS

| | | | |
|---|---|---|---|
| 2016/0007261 A1 | 1/2016 | Oh et al. | |
| 2017/0006539 A1* | 1/2017 | Kakishima | H04B 7/0639 |
| 2017/0164248 A1* | 6/2017 | Weber | H04W 36/0072 |
| 2018/0124766 A1* | 5/2018 | Nagaraja | H04L 5/0048 |
| 2018/0249453 A1* | 8/2018 | Nagaraja | H04W 72/042 |
| 2019/0313308 A1* | 10/2019 | Li | H04W 36/08 |
| 2019/0320355 A1* | 10/2019 | Da Silva | H04W 72/046 |
| 2019/0349830 A1* | 11/2019 | Peisa | H04W 36/08 |
| 2020/0044708 A1* | 2/2020 | Da Silva | H04W 72/087 |

FOREIGN PATENT DOCUMENTS

| | | |
|---|---|---|
| EP | 2434806 A1 | 3/2012 |
| EP | 103220704 A1 | 11/2014 |
| EP | 2874437 A1 | 5/2015 |
| WO | 2017039505 A1 | 3/2017 |

OTHER PUBLICATIONS

3GPP TSG-RAN WG2 Meeting #97bis, Tdoc R2-1702672, "Further details of handover", Agenda Item: 10.2.3.2, Spokane, USA, Apr. 3-7, 2017.

3GPP TSG-RAN WG2#99, Tdoc R2-1707857, Update of R2-1707276, "Further details of handover execution in NR", Agenda Item: 10.2.7, Berlin, Germany, Aug. 21-25, 2017.

CMCC: "Beam Related Measurement Report and Inter-cell HO in NR", 3GPP Draft; R2-1701921 Beam Related Measurement Report and Inter-Cell HO in NR, 3rd Generation Partnershi p Project, (3GPP), Mobile Competence Centre ; 650, Route Des Lucioles, F-06921, Sophia-Antipolis, vol. RAN WG2, No. Athens, Greece; Feb. 13, 2017, Feb. 12, 2017.

Ericsson: "Further details of handover execution in NR", 3GPP Draft; R2-1700863—Further Details of HO Execution in NR, 3rd Generation Partnership Project (3GPP), Mobile Competence Centre 650, Route Des Lucioles ; F-06921 Sophia-Antipolis Cedex, France, vol. RAN WG2, No. Athens, Greece; Feb. 13, 2017-Feb. 17, 2017, Feb. 12, 2017.

3GPP TSG-RAN WG2 #98, Tdoc R2-1704084, Hangzhou, P.R. of China, May 15-19, 2017.

3GPP TSG-RAN WG2 meeting #98, R2-1704001, Hangzhou, China, May 15-19, 2017.

3GPP TS 36.331 V14.2 2 (Apr. 2017), 3rd Generation Partnership Project; Technical Specification Group Radio Access Network; Evolved Universal Terrestrial Radio Access (submitted in Parts 1 of 8).

PCT Publication WO2018/203816 for PCT/SE2018/050458.

* cited by examiner

CSI-RS-Config information elements

```
-- ASN1START

CSI-RS-Config-r10 ::=           SEQUENCE {
    csi-RS-r10                      CHOICE {
        release                         NULL,
        setup                           SEQUENCE {
            antennaPortsCount-r10           ENUMERATED {an1, an2, an4, an8},
            resourceConfig-r10              INTEGER (0..31),
            subframeConfig-r10              INTEGER (0..154),
            p-C-r10                         INTEGER (-8..15)
        }
    }                                                                   OPTIONAL,  -- Need ON
    zeroTxPowerCSI-RS-r10           ZeroTxPowerCSI-RS-Conf-r12          OPTIONAL   -- Need ON
}

CSI-RS-Config-v1250 ::=         SEQUENCE {
    zeroTxPowerCSI-RS2-r12          ZeroTxPowerCSI-RS-Conf-r12          OPTIONAL,  -- Need ON
    ds-ZeroTxPowerCSI-RS-r12        CHOICE {
        release                         NULL,
        setup                           SEQUENCE {
            zeroTxPowerCSI-RS-List-r12      SEQUENCE (SIZE (1..maxDS-ZTP-CSI-RS-r12)) OF ZeroTxPowerCSI-RS-r12
        }
    }                                                                   OPTIONAL   -- Need ON
}

CSI-RS-Config-v1310 ::=         SEQUENCE {
    eMIMO-Type-r13                  CSI-RS-ConfigEMIMO-r13              OPTIONAL   -- Need ON
}

ZeroTxPowerCSI-RS-Conf-r12 ::=  CHOICE {
    release                         NULL,
    setup                           ZeroTxPowerCSI-RS-r12
}

ZeroTxPowerCSI-RS-r12 ::=       SEQUENCE {
    zeroTxPowerResourceConfigList-r12   BIT STRING (SIZE (16)),
    zeroTxPowerSubframeConfig-r12       INTEGER (0..154)
}

-- ASN1STOP
```

FIG. 6

WIRELESS DEVICE, RADIO NETWORK NODE, AND METHODS PERFORMED THEREIN FOR COMMUNICATING IN A WIRELESS COMMUNICATION NETWORK

TECHNICAL FIELD

Embodiments herein relate to a wireless device, a first radio network node and methods performed therein regarding wireless communication. Furthermore, a computer program product and a computer-readable storage medium are also provided herein. In particular, embodiments herein relate to handling communication, e.g. handling or enabling handover, of the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the access node. The access node operates on radio frequencies to communicate over an air interface with the wireless devices within range of the access node. The access node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Scheduled reference signals, called channel-state information reference signals (CSI-RS), are transmitted when needed for a particular connection. CSI comprises Channel Quality Indicator (CQI), Precoding Matrix Indicator (PMI), and Rank Indicator (RI). The CQI is reported by wireless device to the radio network node. The wireless device indicates modulation scheme and coding scheme to the radio network node. To predict the downlink channel condition, CQI feedback by the wireless device may be used as an input. CQI reporting can be based on PMI and RI. PMI is indicated by the wireless device to the radio network node, which precoding matrix may be used for downlink transmission which is determined by RI. The wireless device further indicates the RI to the radio network node, i.e. the number of layers that should be used for downlink transmission to the wireless device. The decision when and how to transmit the CSI-RS is made by the radio network node and the decision is signalled to the involved wireless devices using a so-called measurement grant. When the wireless device receives a measurement grant it measures on a corresponding CSI-RS. The radio network node may choose to transmit CSI-RSs to a wireless device only using beam(s) that are known to be strong for that wireless device, to allow the wireless device to report more detailed information about those beams. Alternatively, the radio network node may choose to transmit CSI-RSs also using beam(s) that are not known to be strong for that wireless device, for instance to enable fast detection of new beam(s) in case the wireless device is moving.

The radio network nodes of a New Radio (NR) network transmit other reference signals as well. For instance, the radio network nodes may transmit so-called demodulation reference signals (DMRS) when transmitting control information or data to a wireless device. Such transmissions are typically made using beam(s) that are known to be strong for that wireless device.

In LTE, the main goal of CSI-RSs is to obtain channel state feedback for up to eight transmit antenna ports to assist the radio network node in its precoding operations. Release 10 supports transmission of CSI-RS for 1, 2, 4 and 8 transmit antenna ports. CSI-RSs also enable the wireless device to estimate the CSI for multiple cells rather than just its serving cell, to support future multi-cell cooperative transmission schemes. Notice that the purpose of CSI-RS measurements in LTE is not to support mobility across cells.

The CSI-RS resource allocation for a given subframe is shown in FIG. 1. Code Division Multiplexing (CDM) codes of length two are used, so that CSI-RSs on two antenna ports share two resource elements (RE) on a given subcarrier. The resource elements used in the case of two CSI-RS antenna ports are a subset of those used for four and eight antenna ports; this helps to simplify the implementation. The total number of supported antenna ports is forty, which can be used to give a frequency-reuse factor of five between cells with eight antenna ports per cell, or a factor of twenty in the case of two antenna ports.

The CSI-RS configuration is wireless device-specific i.e. provided via dedicated Radio Resource Control (RRC) signalling. When configured, CSI-RSs are present only in some subframes following a given duty cycle and subframe offset. The duty cycle and offset of the subframes containing CSI-RSs and the CSI-RS pattern used in those subframes are provided to a Release 10 wireless device through RRC signaling, e.g. see FIG. 2. The duty cycle and subframe offset are jointly coded, while the CSI-RS pattern is configured independently of these two parameters.

In summary, the CSI-RS configuration comprises the following (at least until Rel-10):
  The number of CSI-RS: 1, 2, 4 or 8;
  The CSI-RS periodicity: 5 ms, 10 ms, 20 ms, 40 ms or 80 ms;
  The CSI-RS subframe offset within the CSI-RS period;
  The exact CSR-RS configuration within a resource-block pair—that is exactly what resource elements from the 40 possible REs are used for the up to eight CSI-RS in a resource-block pair.

In the context of cooperative MIMO, it may be possible to improve the performance of channel estimation, and especially interference estimation, by coordinating CSI-RS transmissions across multiple service areas. In Release 10 it is therefore possible to 'mute' a set of REs in data transmissions from a service area. The locations of these REs, known as the 'muting pattern', can be chosen to avoid colliding with CSI-RS transmissions from other service areas and hence improve the inter-cell measurement quality. Notice that in the multi-cell case, there can be some level of coordination so that CSI-RS resource allocation tries to avoid the interference across Transmission and Reception Points (TRP)/service areas, as shown in the FIG. 3 where CSI-RS configuration 0 differs from CSI-RS configuration 1 that also differs from CSI-RS configuration 2. Another important aspect relates to how the wireless device receiver handle the CSI-RS. In LTE, Time and Frequency (T/F) synchronization is obtained from Primary Synchronization Signal (PSS)/Secondary Synchronization Signal (SSS)/Cell Specific Reference Signal (CRS) and Fast Fourier Transform (FFT) is applied to relevant CSI-RS symbols and removes the embedded own-cell ID or RRC configured virtual cell ID (504 possibilities).

The work on Rel-13 FD-MIMO specification in LTE primary includes the support for beamforming in LTE. The wireless device can be configured with a set of CSI-RS processes that can be associated at the network side to different Downlink (DL) beams, which can be different for the different subframes. With beamformed CSI-RS, the wireless device should measure CSI on CSI-RS resources that are beamformed towards different directions, see FIG. 4.

Rel-13 FD-MIMO specification in LTE supports an enhanced CSI-RS reporting called Class B for beamformed CSI-RS. Therein, an LTE RRC_CONNECTED wireless device can be configured with K beams (where 8>K>1) where it can be 1, 2, 4 or 8 port number for each beam. For feedback purposes such as PMI, RI and CQI there is a CSI-RS Resource Indicator (CRI) per CSI-RS. The wireless device reports CRI to indicate the preferred beam where the CRI is wideband, RI/CQI/PMI is based on legacy codebook (i.e. Rel-12) and CRI reporting period is an integer multiple of the RI. For Rel-14 enhancements in Full Dimension (eFD)-MIMO, the following is being considered as potential enhancements such as the extension of CSI-RS antenna port number up to 32 i.e. {20, 24, 28, 32} CSI-RS ports and the introduction of aperiodic CSI-RS, see FIG. 5.

According to the TS 36.331 the CSI-RS configuration (encoded in the CSI-RS-Config IE) can either be transmitted in the RRCConnectionSetup, RRCConnectionResume or the RRC Connection Reconfiguration, with or without mobility Control Information (i.e. in a handover command). See FIG. 6.

It has been agreed in RAN1 that CSI-RS is going to be the primary RS for beam management. Compared to the beamformed CSI-RS in LTE, perhaps the main additional use case would be the analog beam sweep, possibly also used for fine T/F tracking. Hence, more flexibility for the NR CSI-RS in New Radio (NR) is also envisioned such as:
  Possibly transmitted within 1, 2 or 4 symbols;
  Configurable bandwidth (i.e. not always full system as in LTE);
  Orthogonal Frequency Division Multiplexing (OFDM) symbol can carry CSI-RS only;
  Aperiodic, semi-persistent and periodic transmissions;
  Note: Most of the usage of CSI-RS in LTE and so far, mentioned in NR are related to measurement to support beam management. In addition to that, RAN1 and RAN2 have also agreed that CSI-RS can be used for Radio Resource Management (RRM) measurements to support inter-cell mobility, although details have not been defined.

In the following, the mobility in LTE and in particular the handover preparation between eNodeBs (eNB) is described.

In LTE, the handover of a wireless device in RRC_CONNECTED state is a wireless device-assisted network-controlled Handover (HO), with HO preparation signalling in E-UTRAN:
  Part of the HO command comes from the target eNB and is transparently forwarded to the wireless device by the source eNB;
  To prepare the HO, the source eNB passes all necessary information to the target eNB (e.g. E-Radio Access Bearer (RAB) attributes and RRC context);
  Both the source eNB and the wireless device keep some context, e.g. Cell—Radio Network Temporary Identifier (C-RNTI), to enable the return of the wireless device in case of HO failure;
  The wireless device accesses the target cell via Random Access Channel (RACH) following a contention-free procedure using a dedicated RACH preamble or following a contention-based procedure if dedicated RACH preambles are not available; the wireless device uses the dedicated preamble until the handover procedure is finished (successfully or unsuccessfully);
  If the RACH procedure towards the target cell is not successful within a certain time, the wireless device initiates radio link failure recovery using a suitable cell;
  No Robust Header Compression (ROHC) context is transferred at handover;
  ROHC context can be kept at handover within the same eNB.

The preparation and execution phase of the HO procedure is performed without CN involvement (EPC in the case of LTE), i.e. preparation messages are directly exchanged between the eNBs. The release of the resources at the source side during the HO completion phase is triggered by the eNB. The FIG. 7 depicts the basic handover scenario where neither Mobility Management Entity (MME) nor Serving Gateway changes:

Handover preparation in LTE is further described i.e. actions 3, 4, 5 and 6 in FIG. 7. The Handover preparation is initiated by the serving eNodeB that makes decision for a handover, possibly based on MEASUREMENT REPORT and RRM information to hand off the wireless device, see action 3. Then the follow steps occur:

Action 4: The source eNB issues a HANDOVER REQUEST message to the target eNB passing necessary information to prepare the HO at the target side (wireless device X2 signalling context reference at source eNB, wireless device S1 EPC signalling context reference, target cell ID, KeNB*, RRC context including the C-RNTI of the wireless device in the source eNB, AS-configuration, enhanced Radio access bearer (E-RAB) context and physical layer ID of the source cell+short Medium Access Control (MAC)-I for possible Radio Link Failure (RLF) recovery). Wireless device X2/wireless device S1 signalling references enable the target eNB to address the source eNB and the EPC. The E-RAB context includes necessary Radio Network Layer (RNL) and Transport Network Layer (TNL) addressing information, and Quality Of Service (QoS) profiles of the E-RABs.

Action 5: Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Action 6: The target eNB prepares HO with Layer 1 (L1)/Layer 2 (L2) and sends the HANDOVER REQUEST ACKNOWLEDGE to the source eNB. The HANDOVER REQUEST ACKNOWLEDGE message includes a transparent container to be sent to the wireless device as an RRC message to perform the handover. The container includes a new C-RNTI, target eNB security algorithm identifiers for the selected security algorithms, may include a dedicated RACH preamble, and possibly some other parameters i.e. access parameters, System Information Blocks (SIB), etc. The HANDOVER REQUEST ACKNOWLEDGE message may also include RNL/TNL information for the forwarding tunnels, if necessary.

NOTE: As soon as the source eNB receives the HANDOVER REQUEST ACKNOWLEDGE, or as soon as the transmission of the handover command is initiated in the downlink, data forwarding may be initiated.

Handover preparation in NR is mainly a RAN3 issue in standardization and work related to intra-NR mobility has not started. On the other hand, in the RAN2 TR, a similar inter-node signalling as in LTE has been agreed as baseline. Hence, it is expected a similar Xn signalling exchanged between gNodeBs i.e. a Handover Request from serving to target, followed by a Handover Request Ack once admission control occurs in the target.

Thus, in LTE, a handover occurs from the serving cell to the neighbor cell. In order to assist the network, the wireless device is configured to perform RRM measurements for its own cell and compare with the quality of neighbor cells. In other words, the wireless device needs to measure the quality of neighbor cell, report these to the radio network node so a decision can be made.

The network may decide to handover the wireless device from a serving cell to possibly one of the neighbor cell candidates that have been reported. Then, the handover command follows (in LTE this is the RRCConnectionReconfiguration with the IE mobilityControlInformation) containing among other parameters the RACH configuration the wireless device should use the access the target cell such as the Physical Random Access Channel (PRACH) time and frequency resources the wireless device should transmit the preamble (possibly also dedicated and allocated in the same message).

Since handover is a costly procedure in terms of radio signalling, and, in some cases (inter-gNodeB) network signalling, too frequent handovers and ping-pong handover should be avoided or at least minimized (especially because they may also increase the chances of failure). In addition, for battery saving reasons and load, too frequent measurement reports should be avoided or minimized. Hence, event-triggered reports based on filtered measurements are defined per cell in LTE. RAN4 then define requirements on evaluation period of 200 ms for a certain accuracy and wireless device implementation typically picks a snapshot of 40 ms to perform some coherence and on-coherent average over time and frequency.

In NR, there will be deployment in higher frequencies and beamforming will be widely used even for the basic control signals and channels, such as reference signals used for RRM. In addition, current design principles in 3GPP point to the direction where RACH resources are portioned per DL beam transmitting RS for RRM and synchronization, so called a Synchronization Signal (SS) Block Burst Set. So every SS Block may contain its own RACH configuration i.e. Time/Frequency (T/F) resources and even preamble sub-set. The SS Block will contain in its structure some kind of RS that may be used to indicate the beam, often called tertiary synchronization sequence (TSS), although it can possibly be transmitted as a codeword in the SS Block, jointly with the PSS/SSS and the Physical Broadcast Channel (PBCH), see FIG. 8.

Even without directional reciprocity, the implementation enables the target cell to transmit the Random Access Response (RAR) in the strongest DL beam covering the wireless device thanks to the mapping between RACH configuration (including the preamble) and the target cell DL beam. That allows the wireless device to quickly access a narrow beam in the target right after handover execution.

In LTE, RACH resources are defined per cell i.e. when the wireless device receives the Handover (HO) command the wireless device can immediately initiate RACH, at least assuming the wireless device is synchronized (although dedicated resources can be configured); Meanwhile, in NR, RACH resources are defined per DL beam (or groups of DL beam) to allow an efficient RACH detection using analog beamforming (or groups of beams). Hence, the wireless device may select a DL beam before it initiates random access.

In that case, current solutions being discussed point in two possible directions:
- wireless device receives a HO command with PRACH mapping to all possible TSS in the target cell;
- wireless device receives a HO command with a subset of PRACH configurations mapped to a subset of TSS in the target cell;

In latest RAN2 #97bis meeting, there are following agreement made related to HO in NR.

Agreements

1 Handover command can contain at least cell identity of the target cell and RACH configuration(s) associated to the beams of the target cell. RACH configuration(s) can include configuration for contention-free random access.

1b wireless device selects a suitable beam from all beams of the target cell.

1c wireless device performs CBRA on the wireless device's selected beam if Contention Free Random Access (CFRA) resources are not provided for the wireless device's selected beam.

According to this agreement, network (NVV) only tell the wireless device which cell the wireless device should handover to similar as in LTE. While which beam within the target cell wireless device should access to is decided by the wireless device itself.

The agreement in NR has the advantage that the wireless device can select a beam with best radio link quality when it needs to access target cell which might be different from the best beam that it reported to the NW in a measurement report.

However, leaving control to the wireless device has some problems.

First, some beams with good radio link quality in the target cell may be loaded from NW perspective, however the wireless device does not know this. Therefore the wireless device may select those beam to access target cell. The wireless device may then not get a good performance.

Second, sometimes to guarantee the success of random access in target cell, NW will allocate designated preamble for the wireless device to use during random access, i.e. contention free random access (CFRA) procedure. According to current agreement, the wireless device may not select this beam, then the reservation of such preamble is a waste and the successfulness of random access in the target cell may be affected leading to a limited or reduced performance of the wireless communication network.

SUMMARY

An object of embodiments herein is to provide a mechanism that improves the performance of the wireless communication network when using beamforming in a wireless communication network.

According to an aspect the object is achieved by providing a method performed by a wireless device for handling communication of the wireless device in a wireless communication network. A first radio network node serves the wireless device and the wireless communication network further comprises a second radio network node. The wireless device receives a handover command from the first radio network node indicating a handover to a cell served by the second radio network node. The handover command comprises a beam indication controlling which beam of the cell to select by the wireless device. The wireless device further selects a beam of the cell based on at least the beam indication.

According to another aspect the object is achieved by providing a method performed by first radio network node for handling communication of a wireless device in a wireless communication network. The first radio network node serves the wireless device and the wireless communication network further comprises a second radio network node. The first radio network node transmits a handover command to the wireless device indicating a handover to a cell served by the second radio network node, wherein the handover command comprises a beam indication controlling which beam of the cell to select by the wireless device.

It is herein also provided a computer program product comprising instructions, which, when executed on at least one processor, causes the at least one processor to carry out the methods herein, as performed by the first radio network node or the wireless device. Furthermore, it is herein provided a computer-readable storage medium, having stored thereon a computer program product comprising instructions which, when executed on at least one processor, cause the at least one processor to carry out the methods herein, as performed by the first radio network node or the wireless device.

According to yet another aspect the object is achieved by providing a wireless device for handling communication of the wireless device in a wireless communication network, wherein a first radio network node is configured to serve the wireless device and the wireless communication network is configured to comprise a second radio network node. The wireless device is configured to receive a handover command from the first radio network node indicating a handover to a cell served by the second radio network node, wherein the handover command comprises a beam indication controlling which beam of the cell to select by the wireless device. The wireless device is further configured to select a beam of the cell based on at least the beam indication.

According to still another aspect the object is achieved by providing a first radio network node for handling communication of a wireless device in a wireless communication network. The first radio network node is configured to serve the wireless device and the wireless communication network is configured to comprise a second radio network node. The first radio network node is configured to transmit a handover command to the wireless device indicating a handover to a cell served by the second radio network node. The handover command comprises a beam indication controlling which beam of the cell to select by the wireless device.

According to yet still another aspect the object is achieved by providing a wireless device comprising processing circuitry configured to receive a handover command from a first radio network node indicating a handover to a cell served by a second radio network node, wherein the handover command comprises a beam indication controlling which beam of the cell to select by the wireless device. The processing circuitry is further configured to select a beam of the cell based on at least the beam indication.

According to another aspect the object is achieved by providing a first radio network node comprising processing circuitry configured to transmit a handover command to a wireless device indicating a handover to a cell served by a second radio network node. The handover command comprises a beam indication controlling which beam of the cell to select by the wireless device.

Embodiments herein enable that the first radio network node includes the beam indication so that the network can direct the wireless device which beams the wireless device will select, or which beams the wireless device 10 should not select. Thus, the wireless device selects a beam which can meet both a requirement from the network (NW) and/or a requirement from the wireless device. Then both NW and the wireless device can experience better performance during and after a HO. Hence, embodiments herein improve the performance of the wireless communication network.

BRIEF DESCRIPTION OF THE DRAWINGS

Embodiments will now be described in more detail in relation to the enclosed drawings, in which:

FIG. 6 shows a CSI-RS-Config information element;

DETAILED DESCRIPTION

Figure 1:
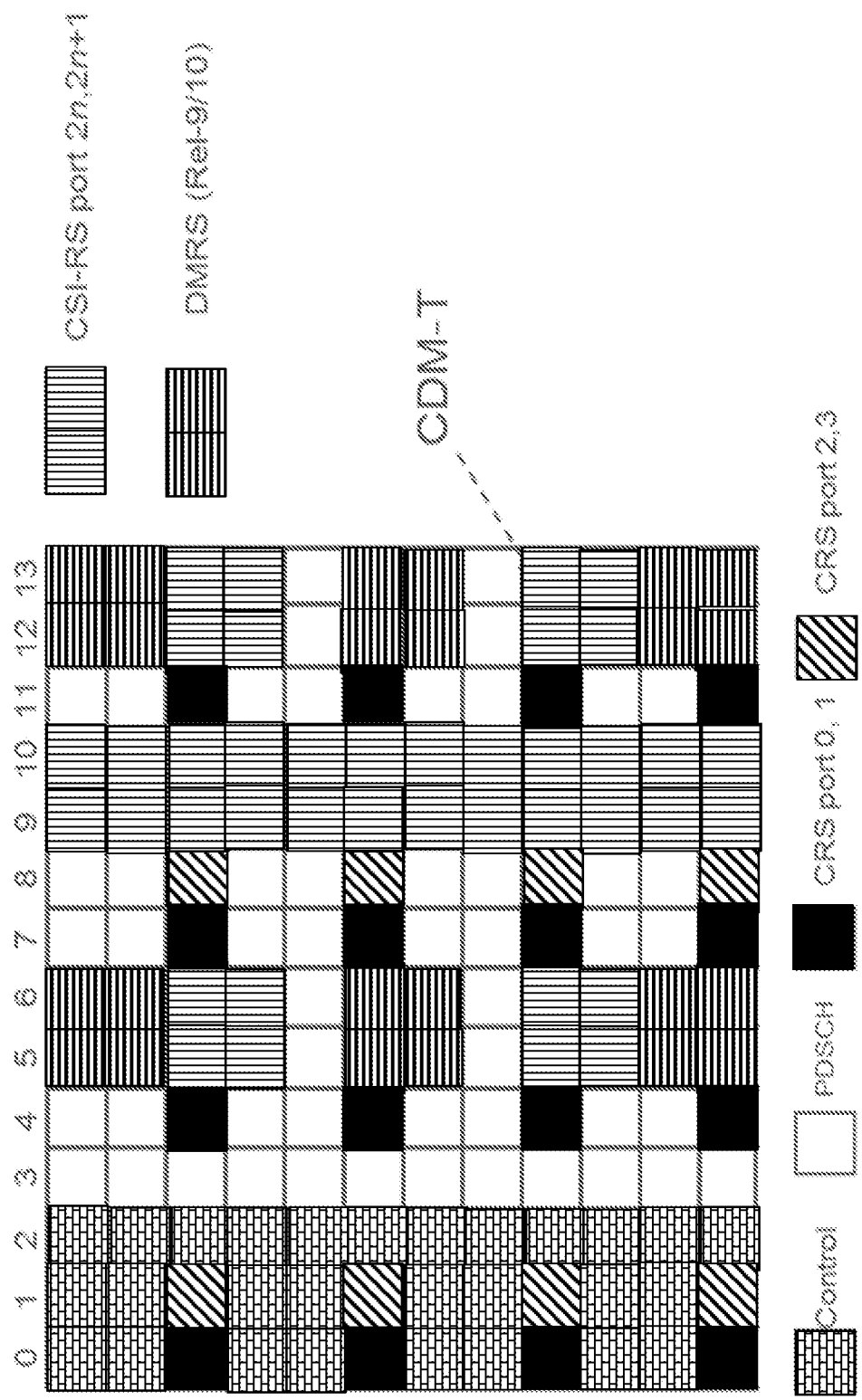
FIG. 1 shows CSI-RS resource allocation for a given subframe and resource block.
Figure 2:
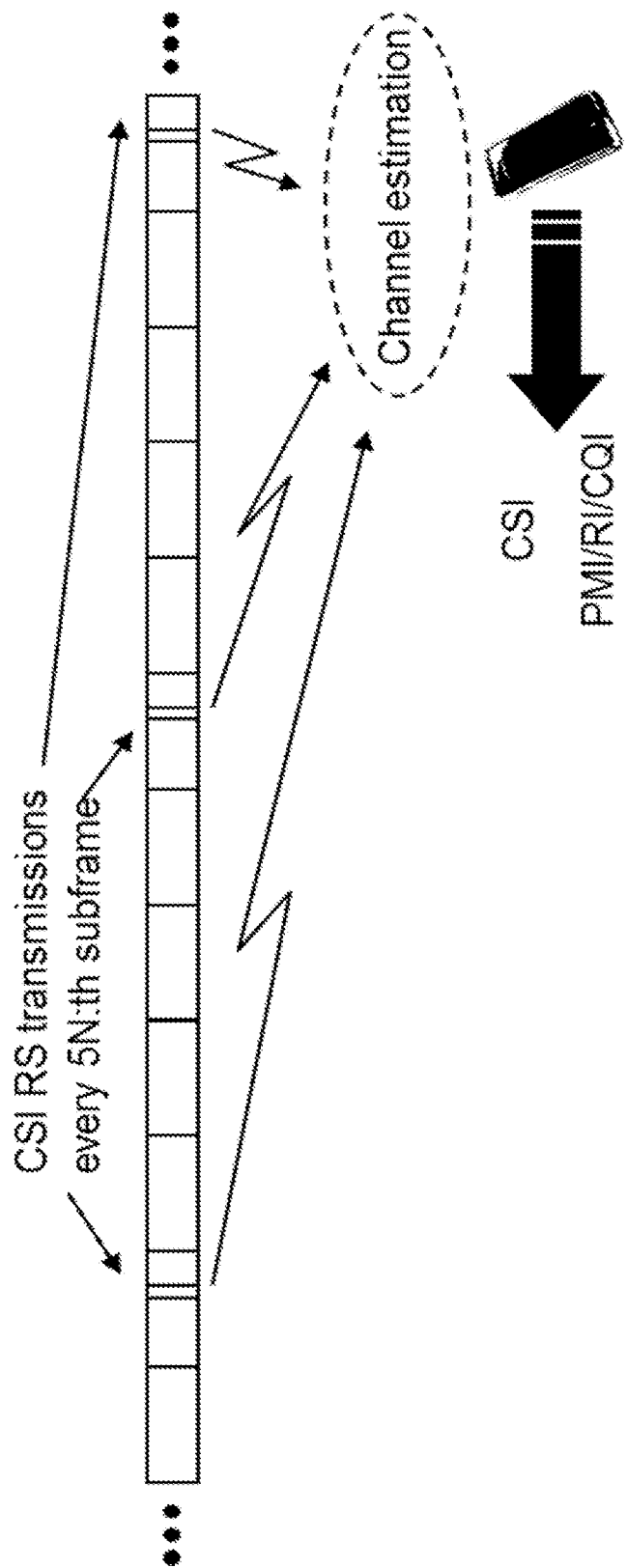
FIG. 2 shows channel estimation of CSI-RS transmissions.
Figure 3:
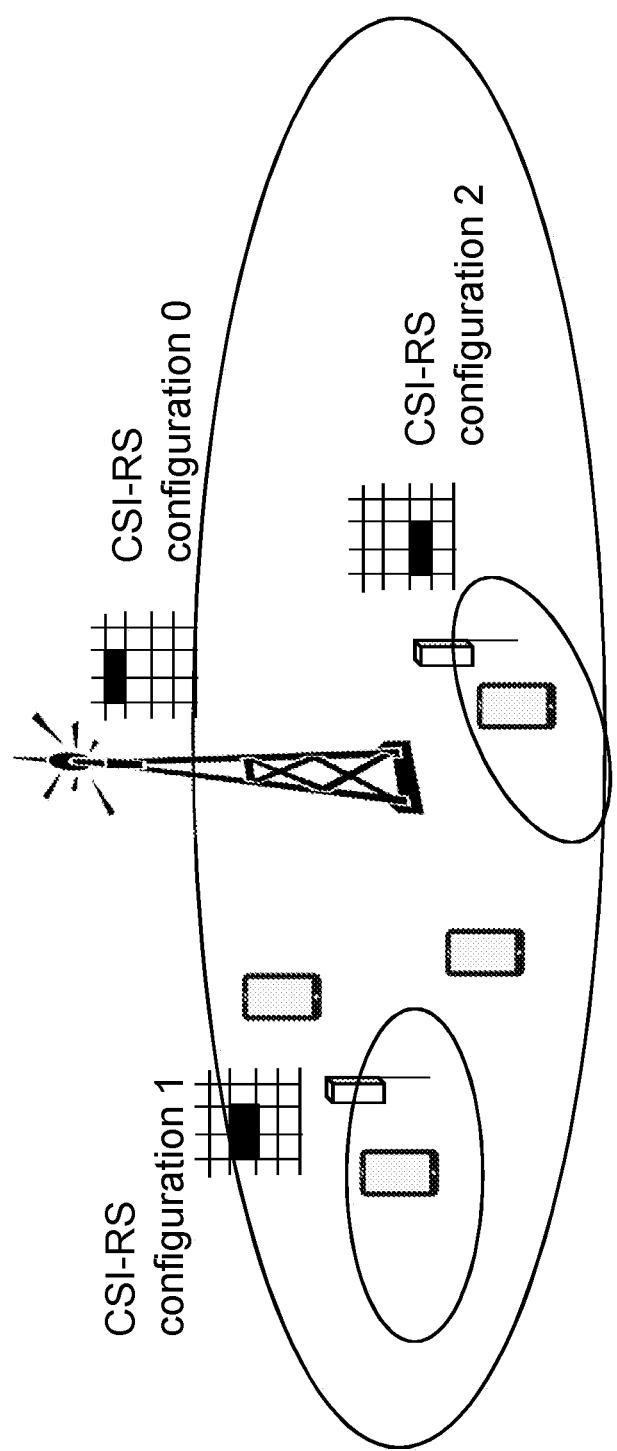
FIG. 3 shows CSI-RS resource allocation across multiple coordinated cells.
Figure 4:
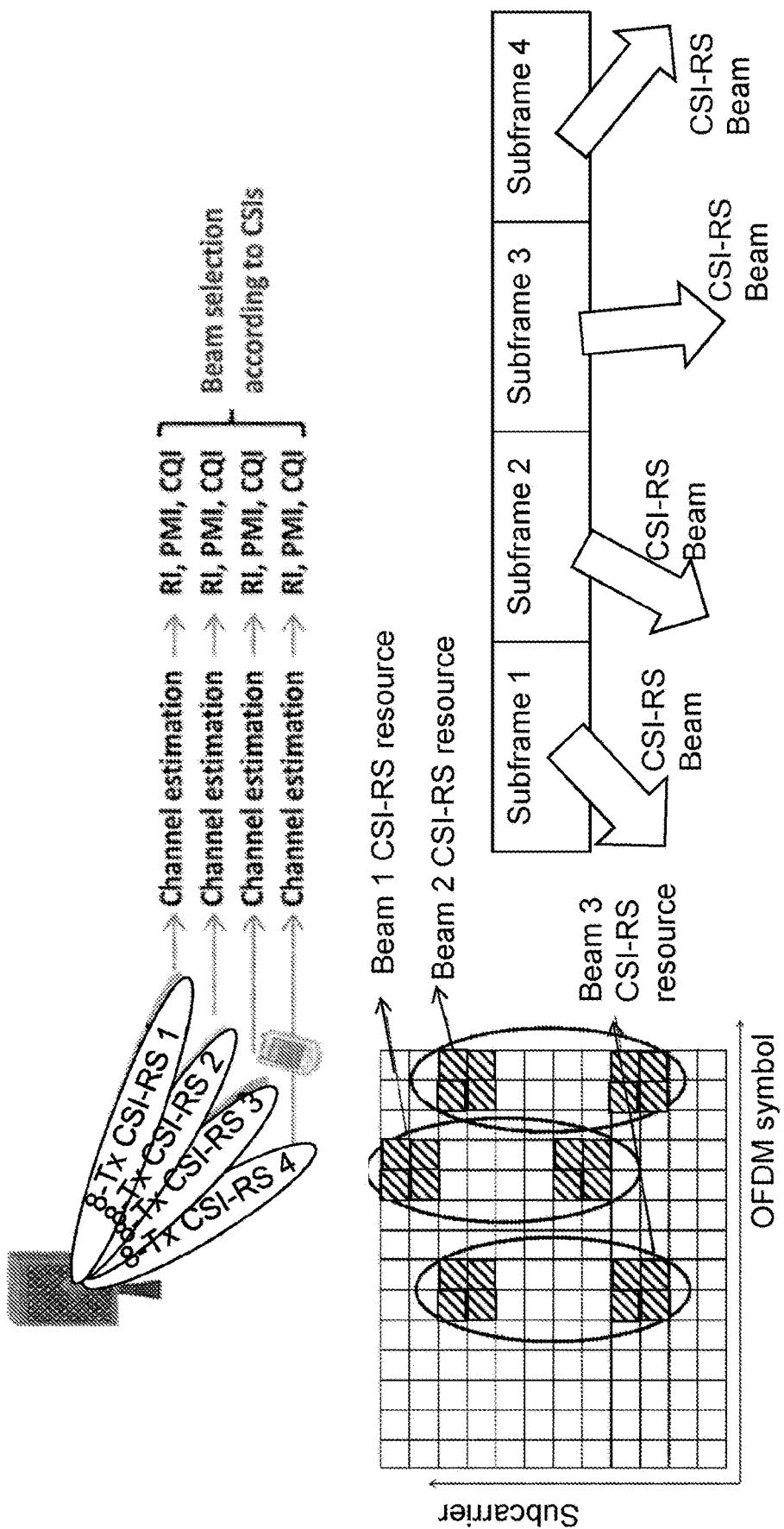
FIG. 4 shows CSI-RS support for beam selection in LTE.
Figure 5:
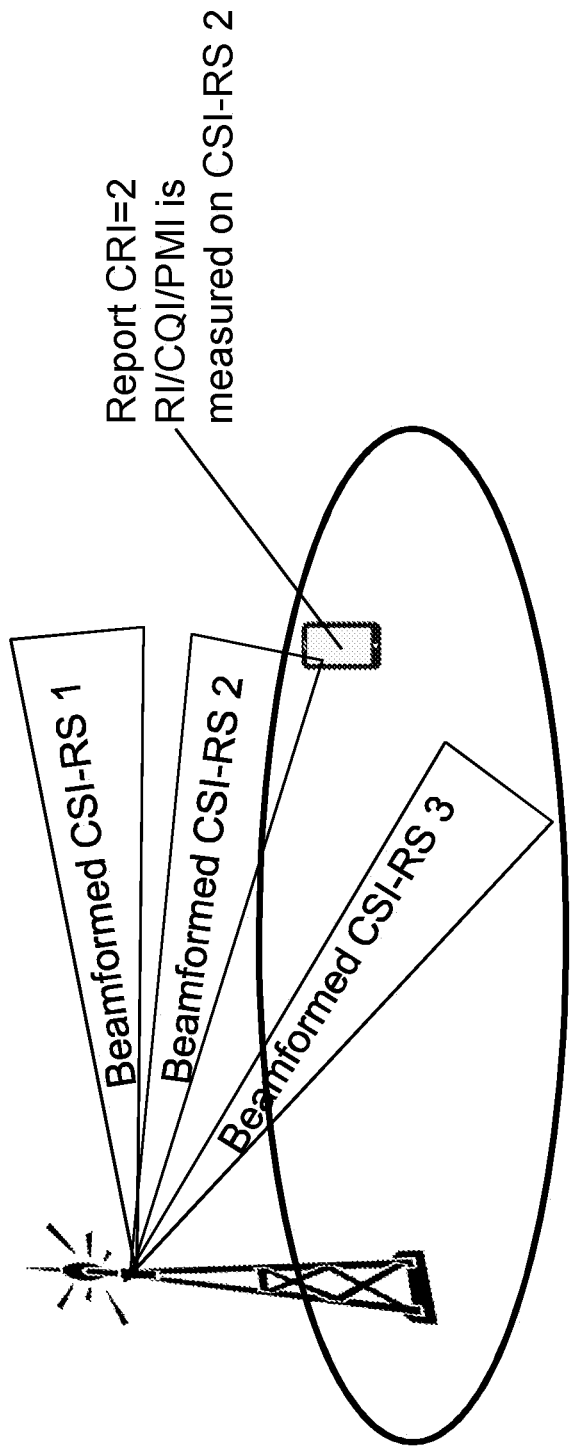
FIG. 5 shows beamformed CSI-RS in LTE.
Figure 7:
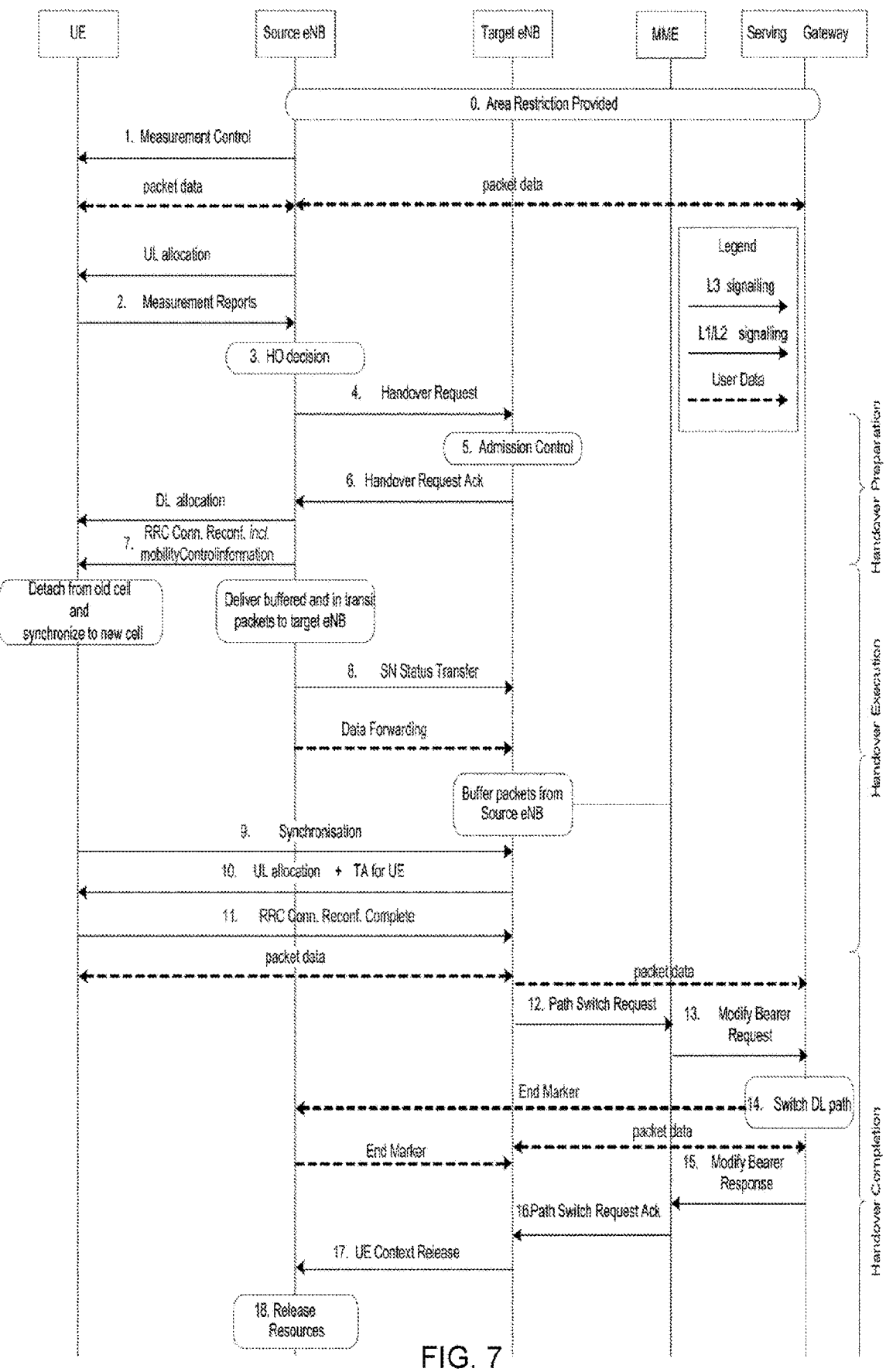
FIG. 7 shows a handover process in LTE.
Figure 8:
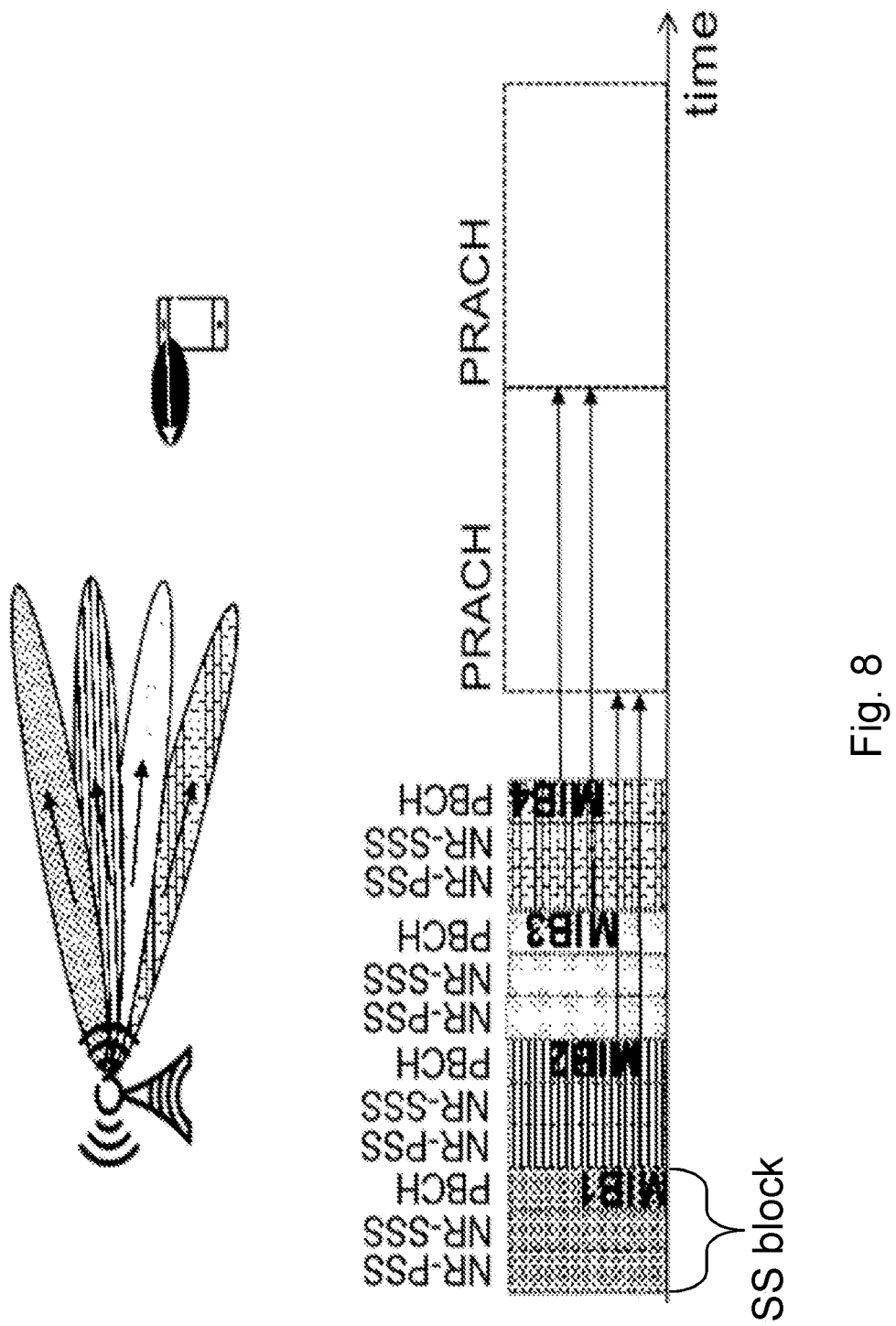
FIG. 8 shows that each SS Block contains a mapping between RACH configuration and the strongest DL beam transmitting the SS Block. In this example, each PRACH occasion/resource is associated with two SS Block beams.
Figure 9A:
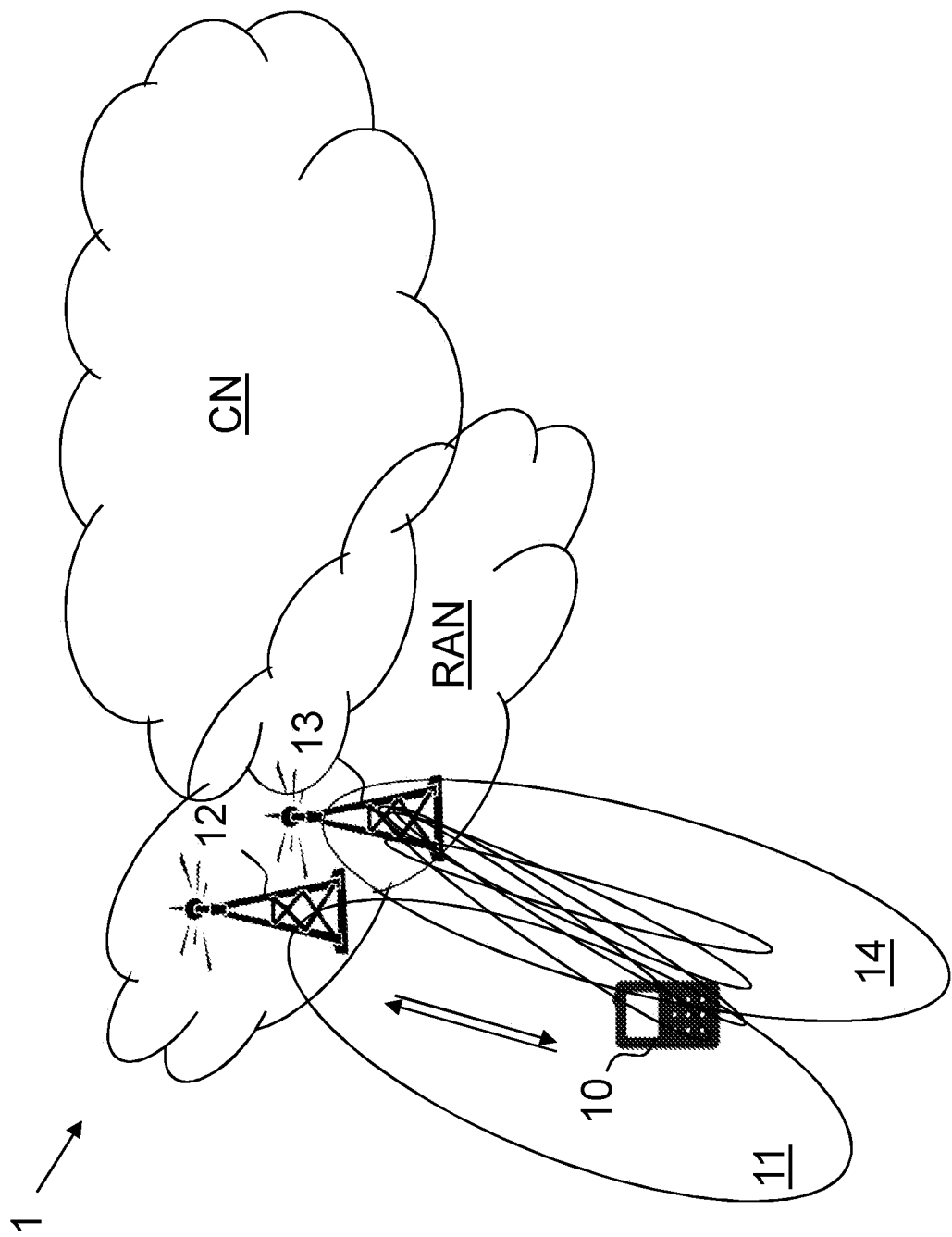
FIG. 9a shows a schematic overview depicting a wireless communication network according to embodiments herein.

Embodiments herein relate to wireless communication networks in general. FIG. 9a is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, a wireless device e.g. a wireless device 10 such as a mobile station, a non-access point (non-AP) STA, a STA, a user equipment and/or a wireless terminal, communicates via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, also referred to as merely a network node, serving or providing radio coverage over a geographical area, a first service area 11 or a first cell, of a first radio access technology (RAT), such as NR, LTE, Wi-Fi, WiMAX or similar. The first radio network node 12 may be a transmission and reception point, a radio network node such as an Mobility Management Entity (MME), a serving Gateway, a Wireless Local-Area Network (VVLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a source beam, and the serving network node serves and communicates with the wireless device 10 in form of DL transmissions to the wireless device 10 and UL transmissions from the wireless device 10.

A second radio network node 13 may further provide radio coverage over a second service area 14 or a second cell of a second radio access technology (RAT), such as NR, LTE, WiMAX or similar. The first RAT and the second RAT may be the same or different RATs. The second radio network node 13 may be a transmission and reception point e.g. a radio network node such as a Wireless Local-Area Network (VVLAN) access point or an Access Point Station (AP STA), an access node, an access controller, a base station, e.g. a radio base station such as a NodeB, an evolved Node B (eNB, eNode B), gNodeB, a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a neighbour network node wherein the second service area 14 may be referred to as a neighbouring beam or a target beam.

It should be noted that a service area may be denoted as a cell, a beam group, a mobility measurement beam, or similar to define an area of radio coverage. The radio network nodes transmit RSs over respective service area in beams. Hence, the first and second radio network nodes may transmit CSI-RSs or beam reference signals (BRS), repeatedly, in time, in a large number of different directions using as many Tx-beams as deemed necessary to cover the service area of the respective radio network node. Hence the first radio network node 12 provides radio coverage over the first service area using a first reference signal, e.g. first CSI-RS, for the first service area 11 in the wireless communication network 1. The second radio network node 13 provides radio coverage over the second service area 14 using a number of beams each with a reference signal, e.g. one or more second CSI-RSs, in the wireless communication network.

During a handover process of the wireless device 10 between the first and second radio network nodes, according to embodiments herein, the first radio network node 12 transmits a handover command to the wireless device 10 indicating a handover to the cell or service area 14 served by the second radio network node 13. The handover command further comprises a beam indication controlling or at least directing which beam of the cell to select by the wireless device 10, wherein the beam indication may e.g. be a threshold for a beam quality and/or a list indicating beams allowable or not allowable. Embodiments herein thus allow the first radio network node 12 to include some information in an HO command so that the network can direct the wireless device 10 which beams the wireless device will select, or which beams the wireless device 10 should not select.

In one case, the first radio network node 12 does not configure Contention Free Random Access (CFRA), i.e. not using dedicated RACH resources, on any of the beams in the target cell and in this case, the first radio network node 12 makes sure the wireless device 10 does not select a beam with radio link quality worse than a threshold, and may furthermore make sure that the wireless device 10 does not select a beam that has some issues from a network perspective, e.g. those beams that are already traffic loaded. Therefore, in the HO command, the first radio network node 12 may include e.g. a beam quality threshold also referred to as radio quality threshold (Min_threshold) and/or a list of beams that the network would not want the wireless device 10 to select, also referred to as a black list of beams.

The pseudo code for this algorithm may be:

---
If (Reference Signal Received Power (RSRP) of SS block > 'Min_threshold' and is not blacklisted by the NW):
    Consider beam associated to SS block suitable for access;
  Else
    Not consider beam associated to this SS block for access;
---

In another case the first radio network node 12 configures CFRA, i.e. dedicating RACH resources, on one or more of the beams in the target cell. Since the first radio network node 12 then reserves a preamble on one or more beams and expects wireless device 10 to do CFRA on those beams to ensure reliability of random access and if the wireless device 10 does not select those beams, then the beams that the wireless device selects must be better enough than the one designated by the first radio network node 12 to motivate such a selection. Otherwise, it is a waste of network resources, and may impact the reliability of random access.

Therefore, in the HO command, the first radio network node 12 may include at least an offset or offset value compared to a radio link quality of contention free (CF) beams, which offset value may be denoted CF_OFFSET.

The pseudo code for this algorithm is as below.

---
if (RSRP of the SS block without CFRA configuration is "CF offset" better than that of SS block with CFRA configuration):
    Consider beam associated to that SS block suitable for access;
Else
    Not consider beam associated to that SS block suitable for access;
If no beam suitable for access
    Select beam with CFRA configured.
---

Figure 9B:
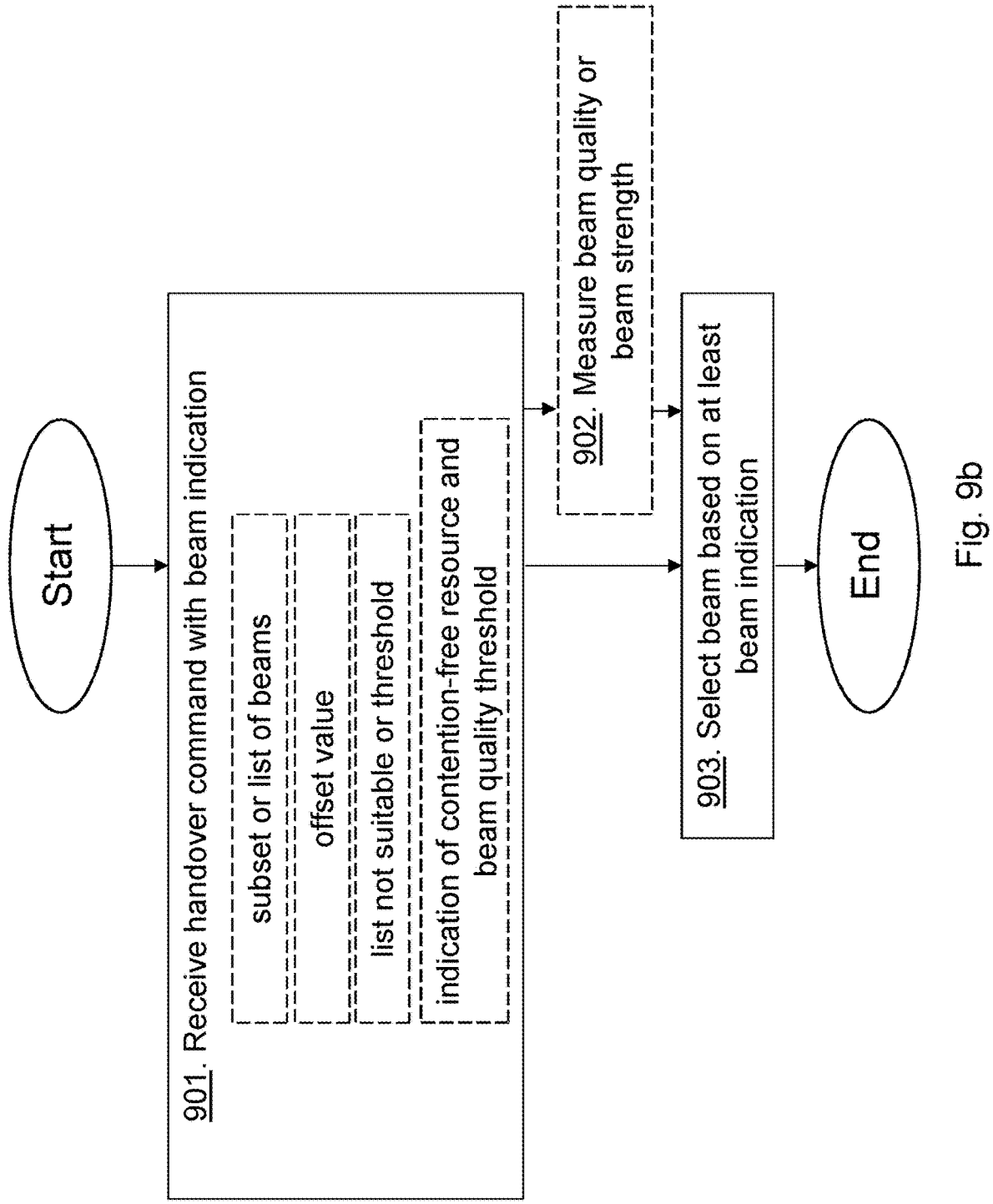
FIG. 9b is a schematic flowchart depicting a method performed by a wireless device according to embodiments herein.

The method actions performed by the wireless device 10 for handling communication of the wireless device 10 in the communication network 1 according to embodiments herein will now be described with reference to a flowchart depicted in FIG. 9b. Examples of the beam indication are marked with dashed boxes. The first radio network node 12 serves the wireless device 10 and the wireless communication network 1 further comprises the second radio network node.

Action 901. The wireless device 10 receives the handover command from the first radio network node 12 indicating a handover to a cell served by the second radio network node 13. The handover command comprises a beam indication controlling which beam of the cell to select by the wireless device 10. The beam indication may indicate a subset of available beams or a list of preferred beams. Additionally or alternatively, the beam indication may indicate an offset value, which offset value is a threshold value that a beam, configured with a contention based random access procedure, needs to outperform a beam, configured with a contention free random access procedure, with to be selected. The beam indication may comprise a list of beams which are not suitable for access, and/or a threshold indicating a threshold for a beam quality or a beam strength for a beam to be selected by the wireless device. Beam quality may also be referred to as radio link quality and may be measured in reference signal received quality (RSRQ) or signal to interference plus noise ratio (SINR). Beam strength may also be referred to as radio link strength and may be measured in reference signal received power (RSRP).

Action 902. The wireless device 10 may measure beam quality or beam strength of reference signals such as CSI-RS, SS blocks or similar of different beams.

Action 903. The wireless device 10 selects a beam of the cell based on at least the beam indication. E.g. the wireless device 10 may select a beam to access and may transmit RACH resources such as preamble and/or time and frequency associated with the selected beam. The association may be according to RACH configuration previously received. The beam indication may comprise at least an indication of a contention-free resource and a beam quality threshold. The wireless device 10 may select a beam of the cell based on at least the beam indication by e.g. measure a beam quality of at least the beam associated with the contention-free resource; and prioritize said beam associated with the contention-free resource when the measured beam quality is better than said beam quality threshold.

Figure 9C:
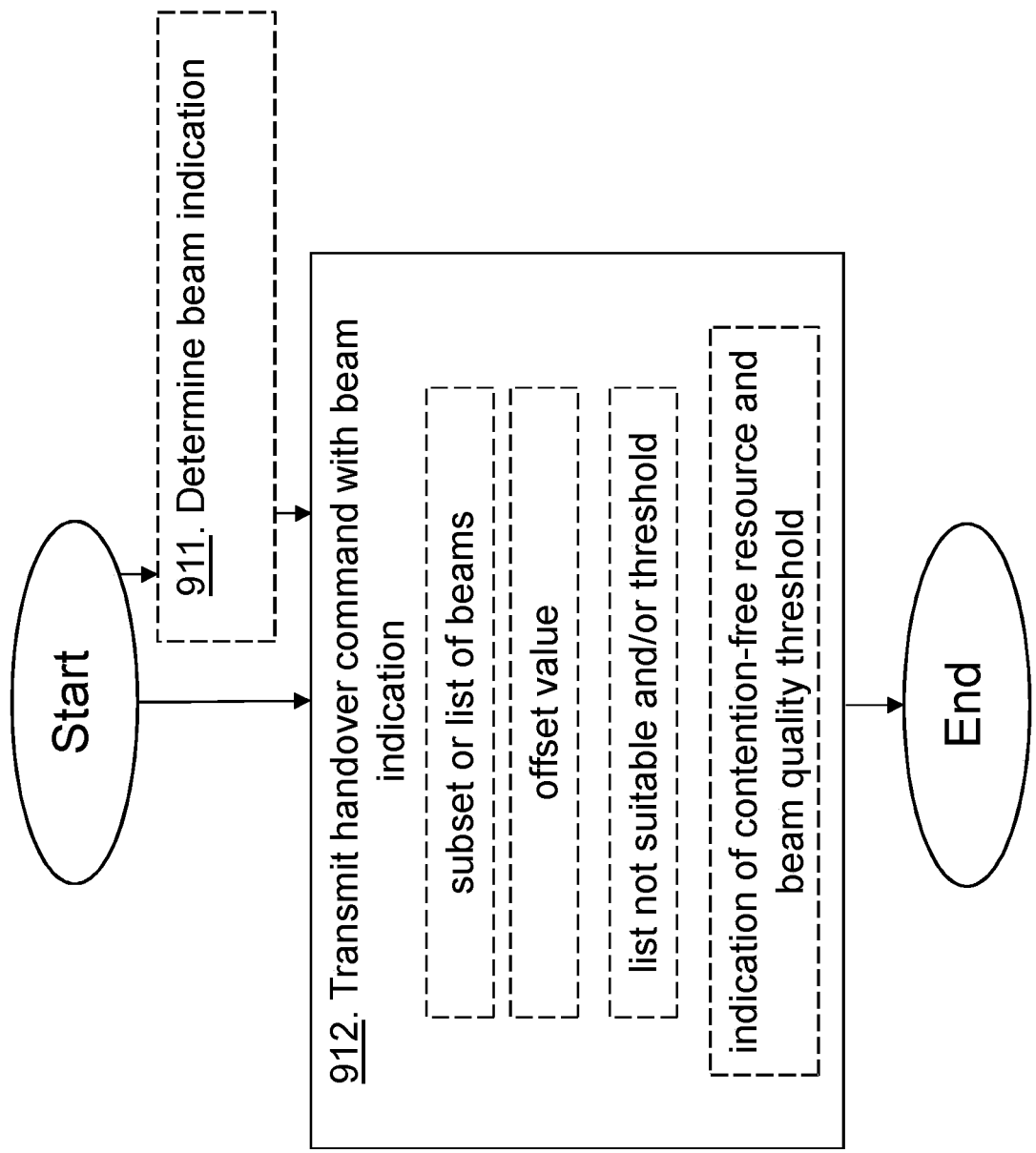
FIG. 9c is a schematic flowchart depicting a method performed by a first radio network node according to embodiments herein.

The method actions performed by the first radio network node 12 for handling communication of the wireless device 10 in the communication network 1 according to embodiments herein will now be described with reference to a flowchart depicted in FIG. 9c. Examples of the beam indication are marked with dashed boxes. The first radio network node 12 serves the wireless device 10 and the wireless communication network 1 further comprises the second radio network node 13.

Action 911. The first radio network node 12 may determine or configure the beam indication e.g. indicating preferred beams and/or the threshold for a beam quality or a beam strength. The beam indication may comprise at least an indication of a contention-free resource and a beam quality threshold.

Action 912. The first radio network node 12 transmits a handover command to the wireless device 10 indicating the handover to the cell served by the second radio network node 13, wherein the handover command comprises the beam indication controlling which beam of the cell to select by the wireless device 10. The beam indication may indicate the subset of available beams or the list of preferred beams. Alternatively or additionally, the beam indication may indicate the offset value, which offset value is the threshold value that a beam, configured with a contention based random access procedure, needs to outperform a beam, configured with a contention free random access procedure, with to be selected. Alternatively or additionally, the beam indication may comprise the list of beams which are not suitable for access, and/or the threshold indicating a threshold for a beam quality or a beam strength for a beam to be selected by the wireless device 10.

Figure 10:
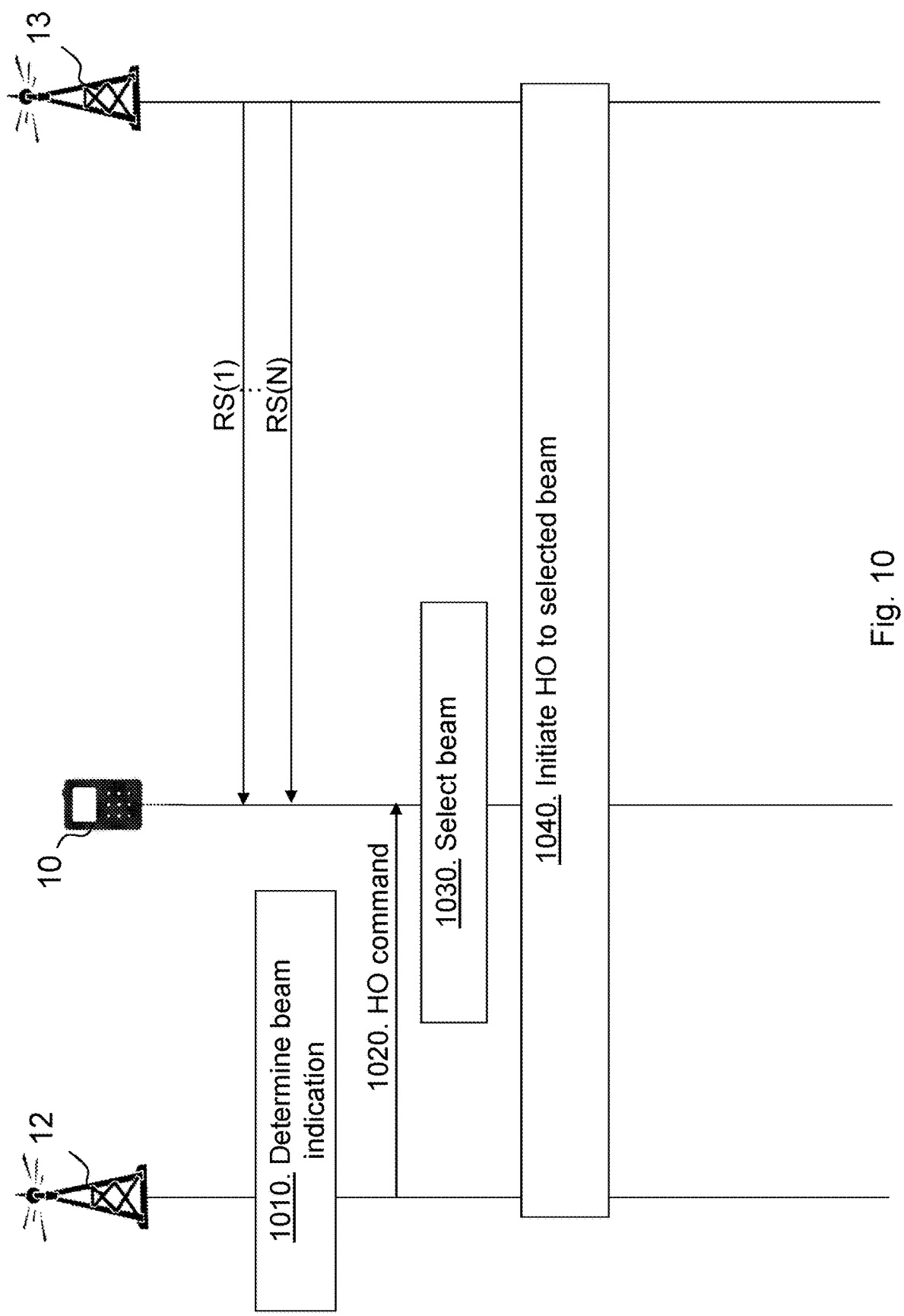
FIG. 10 is a schematic combined flowchart and signalling scheme according to embodiments herein.

FIG. 10 is a combined signaling scheme and flowchart for handling handover according to embodiments herein.

Action 1010. The first radio network node 12 may determine or configure the beam indication indicating preferred beams such as CSI RS to select and/or conditions to be fulfilled such as strength or quality thresholds, see FIGS. 11-15 below. This is an example of action 911 in FIG. 9c.

Action 1020. During a handover process the first radio network node 12 transmits the handover command to the wireless device 10 indicating the handover to the cell served by the second radio network node. The handover command comprises the beam indication controlling or informing which beam or beams of the cell to select by the wireless device 10. Thus the wireless device 10 receives the beam indication indicating preferred or in some embodiments not preferred beams. The beam indication may be a threshold value of strength or quality, a list of not wanted beams, or a list of preferred beams. The beam indication may be a list of beams which are not suitable for access, or a radio link quality threshold for a beam to be selected by the wireless device. This is an example of action 912 in FIG. 9c.

Action 1030. The wireless device 10 may then select a beam taking the received beam indication into account. This is an example of action 903 in FIG. 9b.

Action 1040. The wireless device 10 may then initiate handover or access to the selected beam.

Regarding action 911 above wherein the first radio network node 12 may determine the beam indication, as an example, the first radio network node 12 may configure a list of not allowed beams (a black list) in the target cell. I.e., some beams are not preferred from a handover point of view (e.g. are currently congested) and the first radio network node would like to ensure that the wireless device 10 does not select one of those beams.

The list of not allowed beams may be e.g. included in the handover command, may be preconfigured prior to the handover, may be included in the system information of the source or target cells or provided to the wireless device using other means.

Figure 11:
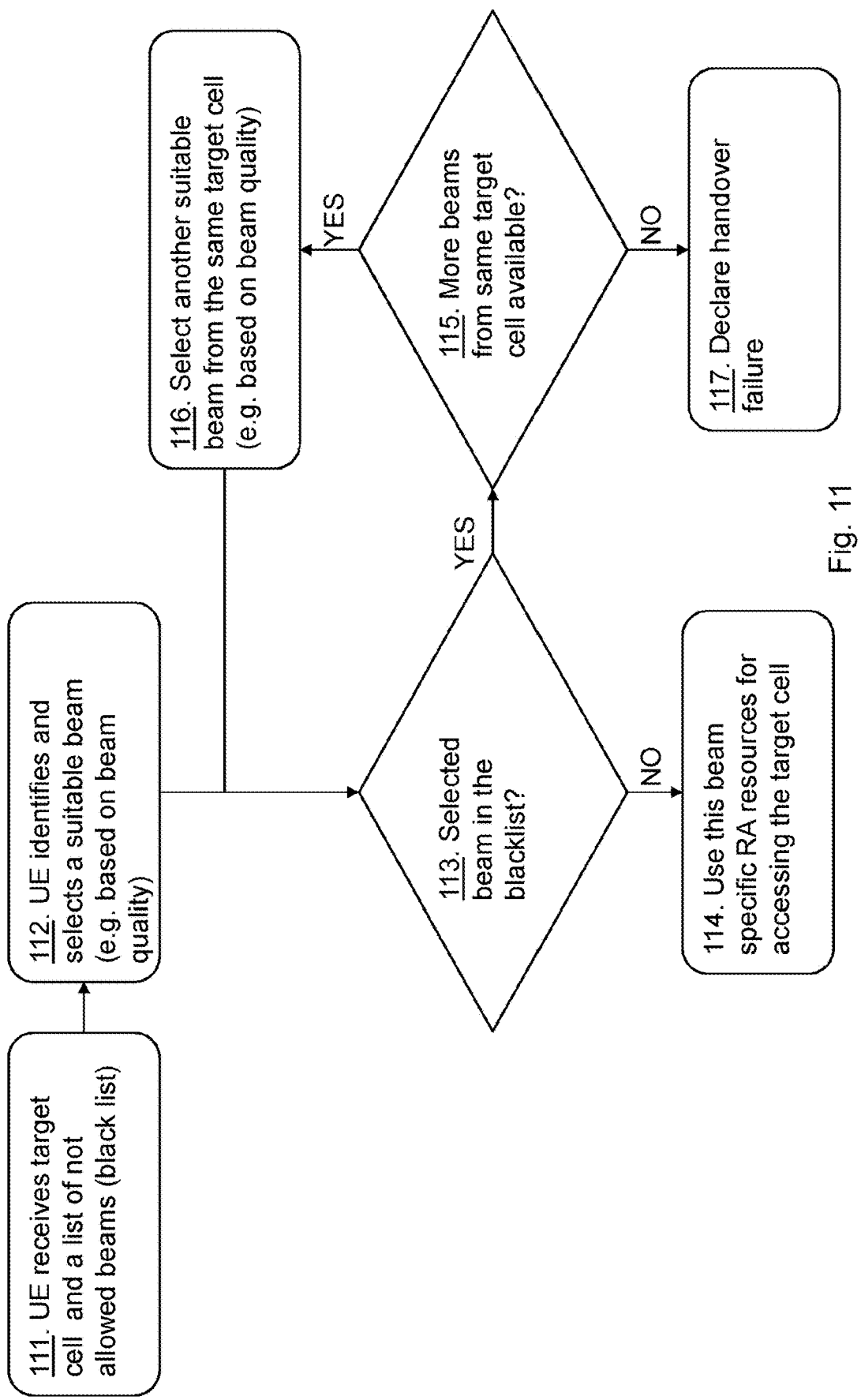
FIG. 11 is a schematic flowchart according to some embodiments herein.

The pseudo code for this method is shown below and is exemplified in FIG. 11.

111) The wireless device 10 receives a target cell and a list of black listed cells from the network 112) The wireless device 10 identifies and selects a suitable beam (e.g. based on the beam quality also referred herein as radio link quality) in the target cell 113) The wireless device 10 determines whether the selected beam is in black list or not.

114) If the selected beam is not included in the black list
The wireless device 10 considers beam associated to this SS block suitable for access;
Else 115)—The wireless device 10 determines if more beams from same target cell available 116) if more beams from same target cell are available
The wireless device 10 may select another beam from the same target cell, and compares it to the black list again using step 113.

117) If no further beams are available, the wireless device 10 considers the handover to have failed and may declare a handover failure.

In another embodiment, the wireless device 10 is allowed to access using a black listed cell if all the detected beams are black listed, i.e. overrun the black list.

The first radio network node 12 may configure a threshold such as a minimum threshold for the beams in the target cell i.e. the second service area.

In this case embodiment, the first radio network node 12 may need to ensure that the wireless device 10 does not select a too weak beam, and provides the beam indication e.g. indicating a minimum allowed quality (threshold) for the beam quality.

The minimum allowed quality for allowed beams can be e.g. included in the handover (HO) command, can be preconfigured prior to the handover or can be included in the system information of the source or target cells or provided to the wireless device using other means.

The pseudo code for this algorithm is as below

121) The wireless device 10 receives a target cell and a minimum quality level for allowed beams (Threshold).

122) The wireless device 10 identifies and selects a suitable beam (e.g. based on the beam quality also referred herein as radio link quality) in the target cell 123) The wireless device 10 determines whether the selected beam is below threshold or not.

124) If (RSRP of SS block>'Min_threshold')
Consider beam associated to SS block suitable for access;
Else 125)—The wireless device 10 determines if more beams from same target cell available 126) if more beams from same target cell are available
The wireless device 10 may select another beam from the same target cell, based on beam quality.

127) If no further beams are available, the wireless device 10 considers the handover to have failed and may declare a handover failure.

Figure 12:
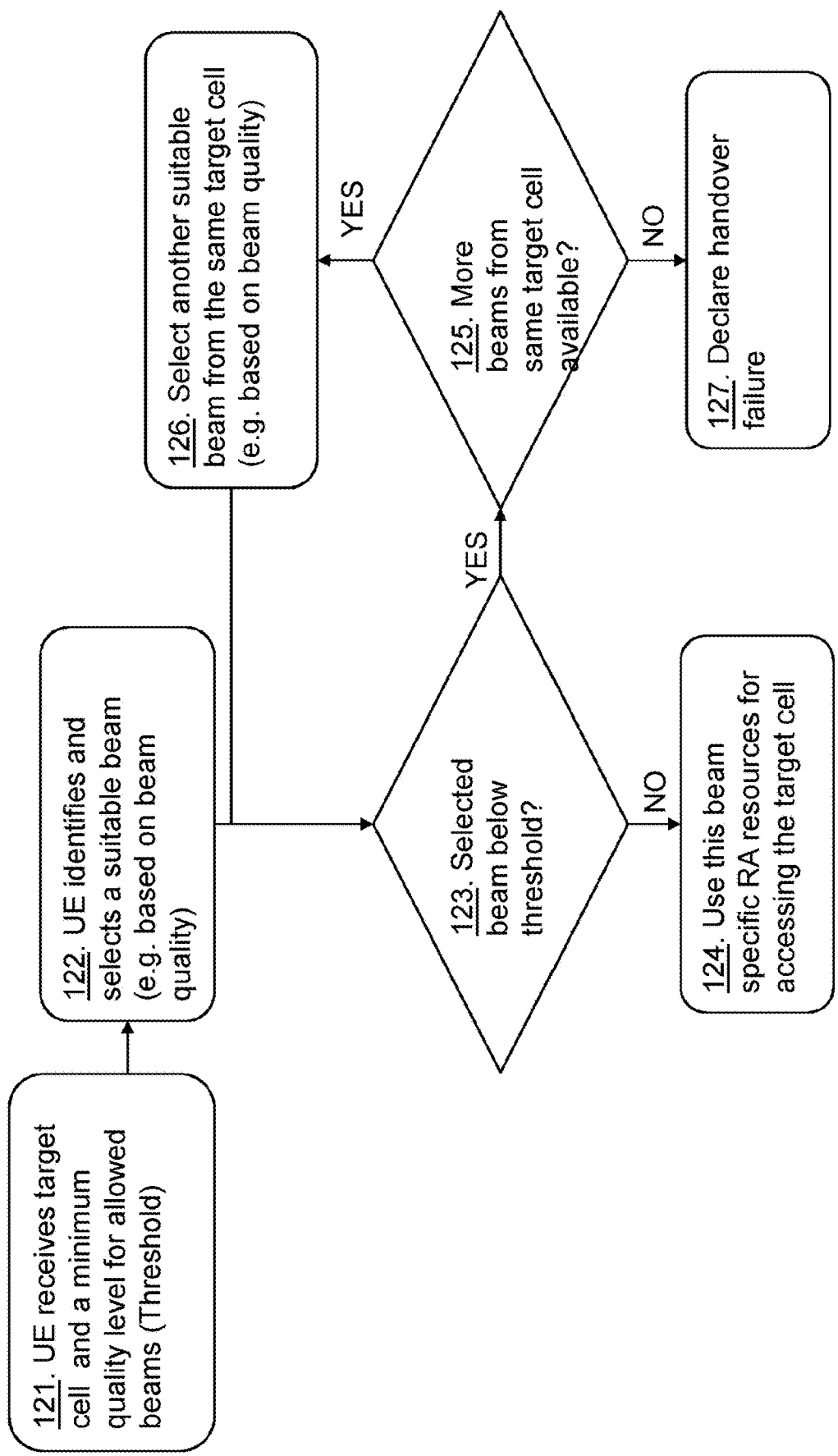
FIG. 12 is a schematic flowchart according to some embodiments herein.

This procedure is shown in FIG. 12.

The first radio network node 12 may configure CFRA on one or more of the beams in the target cell In this case, as the first radio network node 12 reserves preamble on one or more beams and expects the wireless device 10 to do CFRA on those beams to ensure reliability of random access, if the wireless device 10 does not select those beams, then the beams that wireless device 10 select must be better enough than the one designated by the first radio network node to motivate the wireless device selection, otherwise, it is a waste of network resources, and impact the reliability of random access.

Therefore, in the HO command, it can include at least an offset compared to radio link quality of Contention Free (CF) beams denoted as CF_OFFSET.

Figure 13:
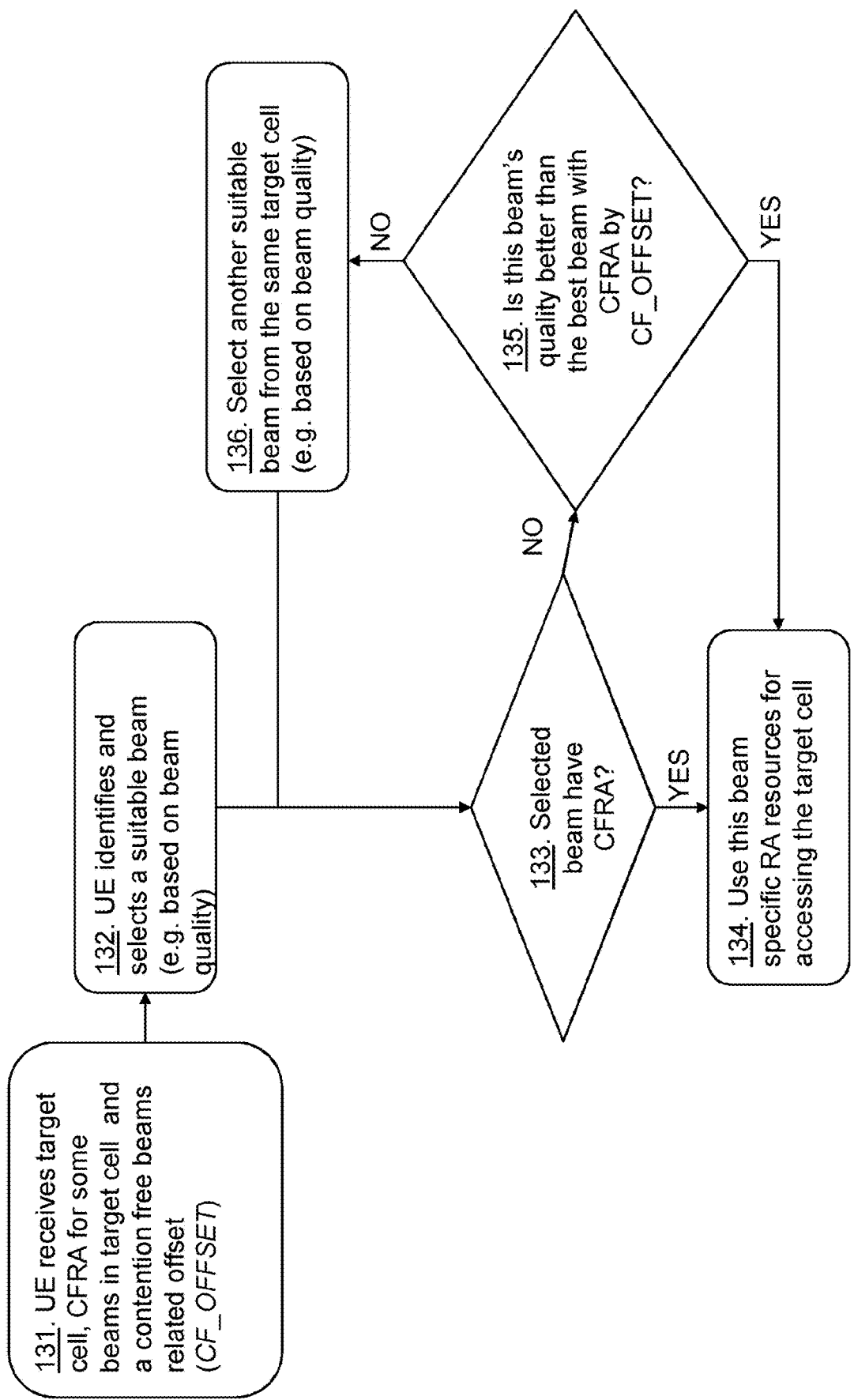
FIG. 13 is a schematic flowchart according to some embodiments herein.

The pseudo code for this algorithm is as shown in FIG. 13.

131) The wireless device 10 receives a target cell and CFRA for some beams in target cell and the offset value related to contention free beams (CF_OFFSET)

132) The wireless device 10 identifies and selects a suitable beam (e.g. based on the beam quality) in the target cell 133) The wireless device 10 determines whether selected beam have CFRA or not.

134) if selected beam have CFRA then use this beam specific RA resources for accessing the target cell;

135) Is this beam's quality better than the best beam with CFRA by CF_OFFSET? I.e. if (RSRP of the SS block without CFRA configuration is "CF offset" better than that of SS block with CFRA configuration)

134) the wireless device 10 considers beam associated to that SS block suitable for access;

Else the wireless device 10 does not consider beam associated to that SS block suitable for access;

136)—The wireless device 10 selects another suitable beam from same target cell available If no beam suitable for access the wireless device 10 selects beam with CFRA configured.

This procedure is shown in FIG. 13.

The first radio network node 12 may configure CFRA on one or more of the beams in the target cell plus may blacklist beams in target cell.

In this case, then wireless device 10 should select a CFRA beam unless a beam with an RSRP that is offset better than that of CFRA beam and not in blacklist in target cell. Otherwise, the wireless device 10 should select CFRA beam.

141) The wireless device 10 receives a target cell and CFRA for some beams in target cell, a contention free beams related offset (CF_OFFSET) and a list of not allowed beams (blacklist).

142) The wireless device 10 identifies and selects a suitable beam (e.g. based on the beam quality) in the target cell.

143) The wireless device 10 determines whether selected beam is in the blacklist.

144) If the beam is not in the blacklist the wireless device determines whether the selected beam has CFRA.

145) If not CFRA it is determined whether the selected beam's quality is better than the best beam with CFRA by CF_OFFSET?

I.e. if (RSRP of the SS block without CFRA configuration is "CF offset" better than that of SS block with CFRA configuration & SS block is not in blacklist of target cell)

146) the wireless device 10 considers beam associated to that SS block suitable for access i.e. use this beam specific RA resources for accessing the target cell;

Else the wireless device 10 does not consider beam associated to that SS block suitable for access.

147) The wireless device 10 may select another beam from the same target cell, based on beam quality.

If no beam suitable for access the wireless device 10 may select beam with CFRA configured.

148) If no further beams are available, the wireless device 10 considers the handover to have failed and may declare a handover failure.

Figure 14:
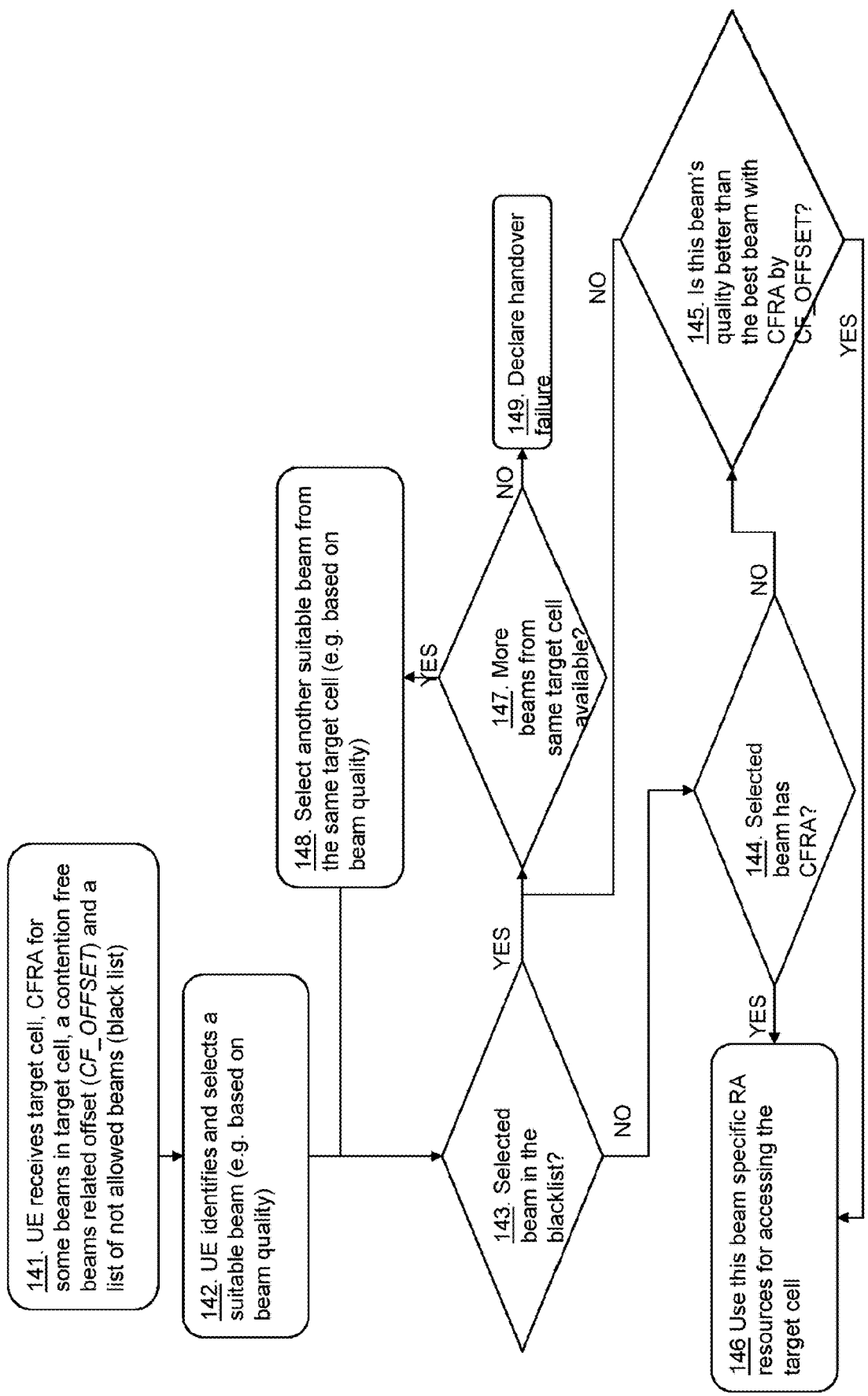
FIG. 14 is a schematic flowchart according to some embodiments herein.

The process is shown in FIG. 14.

The first radio network node 12 may also configure a whitelist of beams.

The white listed beams are the one or ones that the first radio network node 12 suggests the wireless device to choose. But in order to make sure that a beam in whitelist does not have too bad radio link quality, the first radio network node 12 may also configure a WHITELIST_OFFSET, which indicate how much worse white list beam can be compared to best beam. Unless beam in whitelist is not offset worse than best beam, the wireless device may select them, otherwise, the wireless device 10 will not select them. CFRA beam can be seen as a whitelist beam.

151) The wireless device 10 receives a target cell and a list of whitelisted beams and a WHITELIST_OFFSET 152) The wireless device 10 identifies and selects a suitable beam (e.g. based on the beam quality) from the whitelist.

153) The wireless device 10 determines whether selected beam is within whitelist offset.

154) If yes, use this beam specific RA resources for accessing the target cell.

155) if no, determine if any other Whitelist beams from same target cell is available?

156) if available, the wireless device 10 may select another suitable whitelisted beam from the same target cell (e.g. based on beam quality);

157) if not available, the wireless device 10 may determine if another beam is available 158) If another beam is available the wireless device 10 may select the beam (e.g. based on beam quality) (and proceed to 159).

159) If no further beams are available, the wireless device 10 considers the handover to have failed and may declare a handover failure.

The pseudo code may be as below

--- if (RSRP of the SS block within whitelist is not WHITELIST_OFFSET worse than best SS block)

---

The first radio network node 12 considers the beam associated to that SS block in whitelist suitable for access;

If no beam in whitelist suitable for access the first radio network node 12 selects beam not in whitelist.

Figure 15:
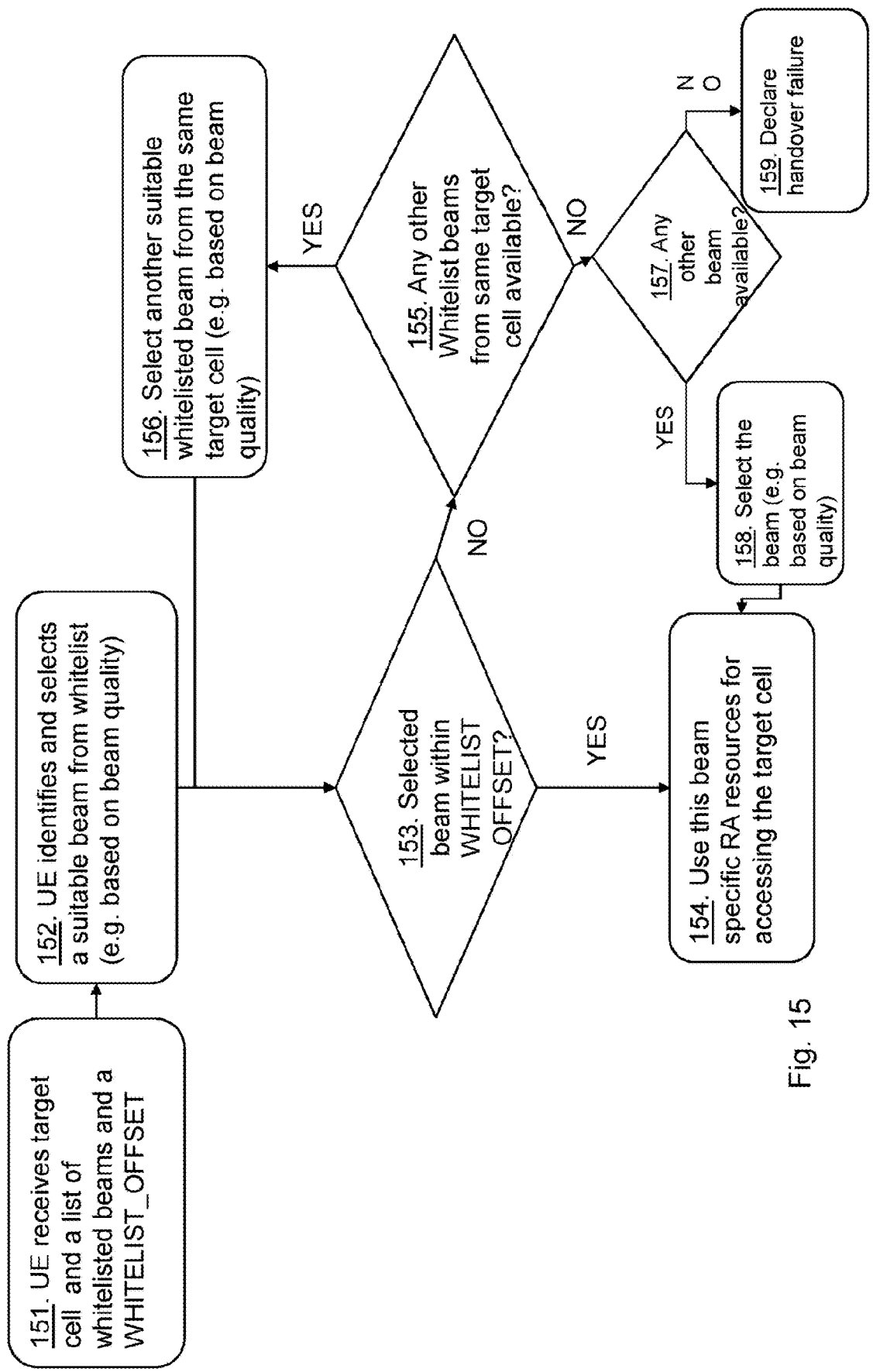
FIG. 15 is a schematic flowchart according to some embodiments herein.

The process is shown in FIG. 15.

Various embodiments can also be combined to create further embodiments. For example, FIG. 13 shows how embodiments in FIGS. 11 and 12 may be combined to allow the network to control both the allowed beams and set a minimum suitable level for suitable cells. Similar combinations of other embodiments are also possible.

The previously describe embodiment associate the beam selection at the wireless device side based on e.g. a RS within an SS Block, such as the RACH association provided by the network. In addition to it, a set of equivalent embodiments could be defined when CSI-RS resources are configured for RRM measurement or handover optimization. In that case, each CSI-RS resource, such as time, frequency and sequence, may be associated to a beam in the DL. The wireless device 10 may also be configured with a notion of group in such a way that it knows which CSI-RSs are associated with which resources. Hence, assuming that the HO command may contain a RACH to CSI-RS association, just as we described for the SS Blocks, the concept of blacklist of beam or whitelist of beams can also be applied herein.

Alternatively, a network implementation may be achieved by not configuring the wireless device 10 to access a target area via SS blocks but by using CSI-RS association to RACH and only configuring CSI-RSs for that access in the allowed area e.g. the areas associated to beams the network is aware of not being overloaded. Hence, the network can simply configure a subset of CSI-RS out of all possible CSI-RSs covering the whole cell and provide RACH resources for the subset.

It should be noted that in a general scenario the term "radio network node" can be substituted with "transmission and reception point". The key observation is that it must be possible to make a distinction between the transmission reception points (TRPs), typically based on RSs or different synchronization signals and BRSs transmitted. Several TRPs may be logically connected to the same radio network node but if they are geographically separated, or are pointing in different propagation directions, the TRPs will be subject to the same issues as different radio network nodes. In subsequent sections, the terms "radio network node" and "TRP" can be thought of as interchangeable.

It should further be noted that a wireless communication network may be a virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

Figure 16:
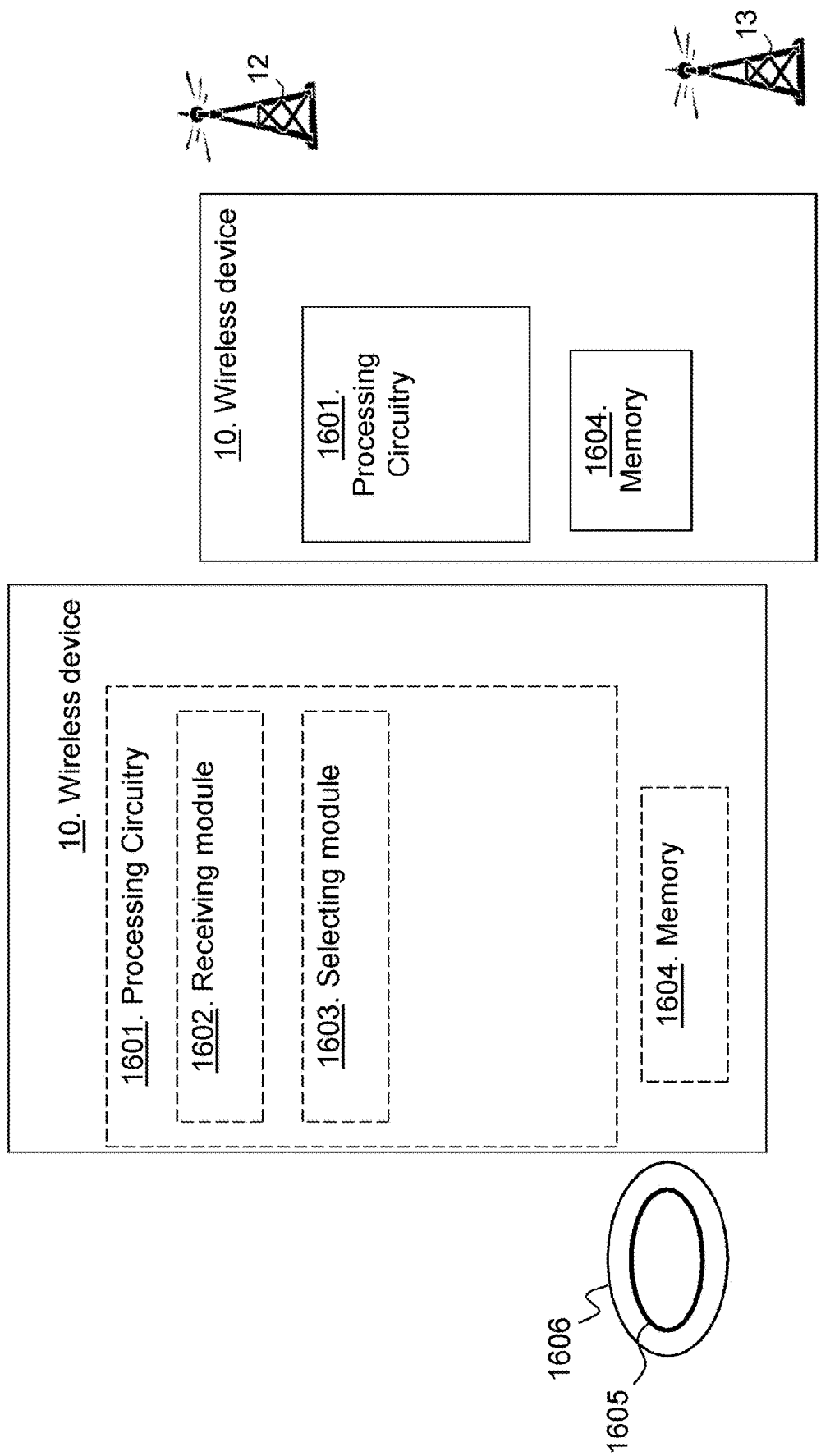
FIG. 16 is a block diagram depicting a wireless device according to embodiments herein.

FIG. 16 is a block diagram depicting the wireless device 10 according to embodiments herein for handling communication of the wireless device 10 in the wireless communication network 1. The wireless communication network 1 is configured to comprise the second radio network node 13. The first radio network node 12 is configured to serve the wireless device 10 and the wireless communication network 1 further comprises the second radio network node 13.

The wireless device 10 may comprise processing circuitry 1601, e.g. one or more processors, configured to perform the methods herein.

The wireless device 10 may comprise a receiving module 1602, e.g. a receiver or transceiver. The wireless device 10, the processing circuitry 1601, and/or the receiving module 1602 is configured to receive the handover command from the first radio network node 12 indicating a handover to a cell served by the second radio network node 13, wherein the handover command comprises a beam indication controlling which beam of the cell to select by the wireless device 10. E.g. the handover command further comprises the beam indication controlling or indicating which beam of the cell to select by the wireless device. The indication may be a list of beams which are not suitable to access, or a radio link quality threshold.

The wireless device 10 may comprise a selecting module 1603. The wireless device 10, the processing circuitry 1601, and/or the selecting module 1603 is configured to select a beam of the cell based on at least the beam indication. The wireless device 10, the processing circuitry 1601, and/or the selecting module 1603 may be configured to measure strength or quality of beams and take this into account as well. The beam indication may comprise at least an indication of a contention-free resource and a beam quality threshold. The wireless device 10, the processing circuitry 1601, and/or the selecting module 1603 may be configured to select a beam of the cell based on at least the beam indication by e.g. measure a beam quality of at least the beam associated with the contention-free resource; and prioritize said beam associated with the contention-free resource when the measured beam quality is better than said beam quality threshold. The beam indication may indicate a subset of available beams or a list of preferred beams. The beam indication may indicate an offset value, which offset value is a threshold value that a beam, configured with a contention based random access procedure, needs to outperform a beam, configured with a contention free random access procedure, with to be selected. The beam indication may comprise a list of beams which beams are not suitable for access, and/or a threshold indicating a threshold for a beam quality or a beam strength for a beam to be selected by the wireless device.

The wireless device 10 further comprises a memory 1604. The memory comprises one or more units to be used to store data on, such as strengths qualities, indications, beams, CSI-RSs, thresholds, applications to perform the methods disclosed herein when being executed, and similar.

The methods according to the embodiments described herein for the wireless device 10 are respectively implemented by means of e.g. a computer program product 1605 or a computer program, comprising instructions, i.e., software code portions, which, when executed on at least one processor, cause the at least one processor to carry out the actions described herein, as performed by the wireless device 10. The computer program product 1605 may be stored on a computer-readable storage medium 1606, e.g. a disc, a universal serial bus (USB) stick or similar. The computer-readable storage medium 1606, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium.

It is herein disclosed a wireless device comprising processing circuitry configured to receive a handover command from a first radio network node indicating a handover to a cell served by a second radio network node, wherein the handover command comprises a beam indication controlling which beam of the cell to select by the wireless device; and to select a beam of the cell based on at least the beam indication.

Figure 17:
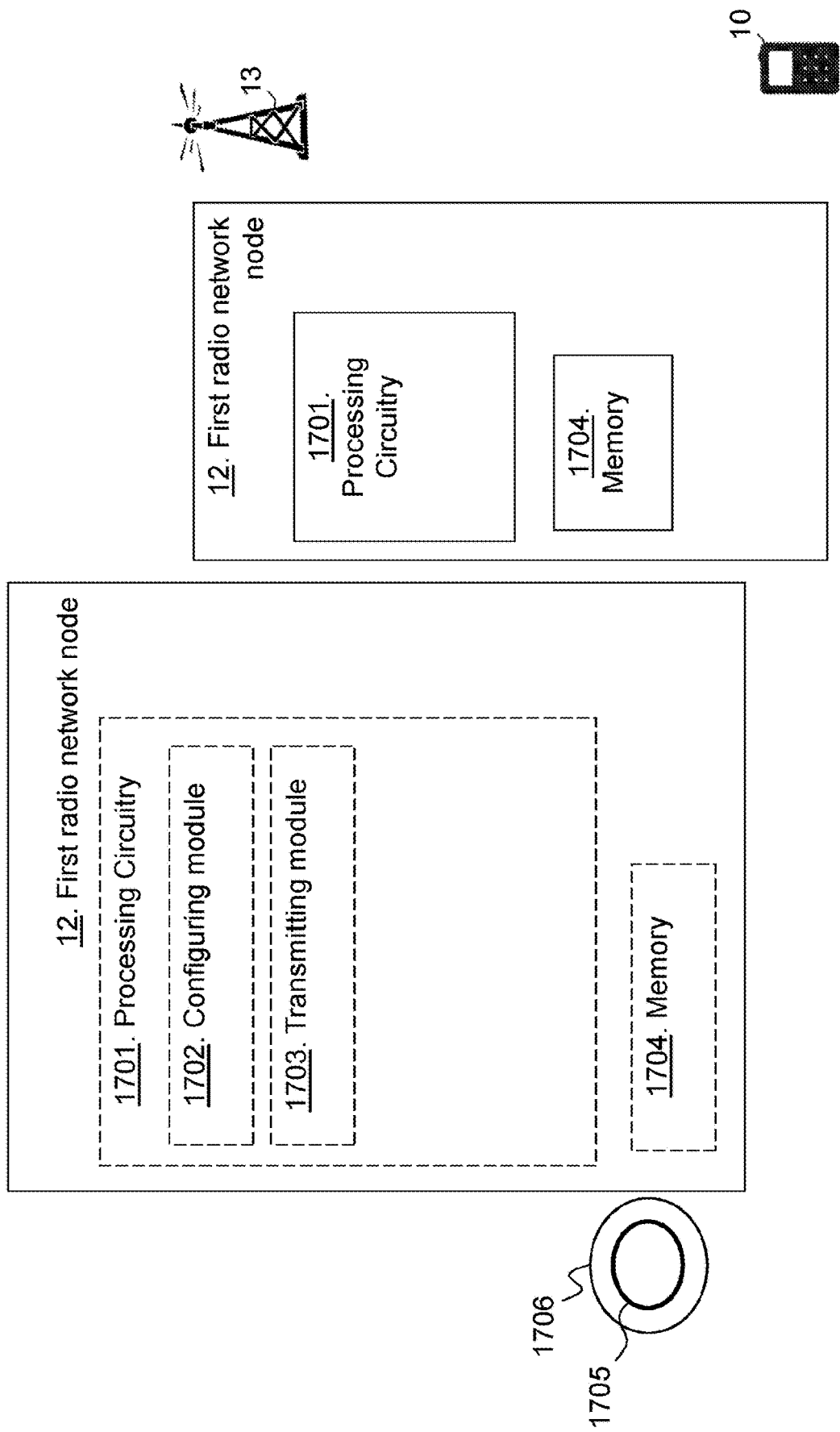
FIG. 17 is a block diagram depicting a first radio network node according to embodiments herein.

FIG. 17 is a block diagram depicting the first radio network node 12, such as a gNB, MME or similar, according to embodiments herein for handling communication of the wireless device 10 in the wireless communication network. The first radio network node 12 is configured to serve the wireless device 10 and the wireless communication network 1 is configured to comprise a second radio network node e.g. further comprises the second radio network node 13.

The first radio network node 12 may comprise processing circuitry 1701, e.g. one or more processors, configured to perform the methods herein.

The first radio network node 12 may comprise a configuring module 1702. The first radio network node 12, the processing circuitry 1701, and/or the configuring module 1702 may be configured to determine or configure the beam indication.

The first radio network node 12 may comprise a transmitting module 1703, e.g. a transmitter or a transceiver. The first radio network node 12, the processing circuitry 1701, and/or the transmitting module 1703 is configured to transmit the handover command to the wireless device 10 indicating a handover to a cell served by the second radio network node 13, wherein the handover command comprises a beam indication controlling which beam of the cell to select by the wireless device. The first radio network node 12, the processing circuitry 1701, and/or the transmitting module 1703 may be configured to transmit the beam indication to the wireless device 10. The handover command comprises the beam indication controlling which beam of the cell to select by the wireless device. The beam indication may indicate a subset of available beams or a list of preferred beams. The beam indication may indicate an offset value, which offset value is a threshold value that a beam, configured with a contention based random access procedure, needs to outperform a beam, configured with a contention free random access procedure, with to be selected. The beam indication may comprise a list of beams which are not suitable for access, and/or a threshold indicating a threshold for a beam quality or a beam strength for a beam to be selected by the wireless device. The beam indication may comprise at least an indication of a contention-free resource and a beam quality threshold. The first radio network node 12 further comprises a memory 1704. The memory comprises one or more units to be used to store data on, such as beam indications, strengths qualities, thresholds, beams, cells, applications to perform the methods disclosed herein when being executed, and similar.

The methods according to the embodiments described herein for the first radio network node 12 are respectively implemented by means of e.g. a computer program product 1705 or a computer program, comprising instructions, i.e., software code portions, which, when executed on at least one processor, cause the at least one processor to carry out the actions described herein, as performed by the first radio network node 12. The computer program product 1705 may be stored on a computer-readable storage medium 1706, e.g. a disc, a USB stick, or similar. The computer-readable storage medium 1706, having stored thereon the computer program product, may comprise the instructions which, when executed on at least one processor, cause the at least one processor to carry out the actions described herein, as performed by the first radio network node 12. In some embodiments, the computer-readable storage medium may be a non-transitory computer-readable storage medium.

It is herein disclosed a first radio network node comprising processing circuitry configured to transmit a handover command to a wireless device indicating a handover to a cell served by a second radio network node, wherein the handover command comprises a beam indication controlling which beam of the cell to select by the wireless device.

It is herein disclosed a method performed by the wireless device for handling communication of the wireless device in the wireless communication network. The first radio network node serves the wireless device and the wireless communication network further comprises the second radio network node. The wireless device receives the handover command from the first radio network node indicating a handover to a cell served by the second radio network node, the handover command further comprises the beam indication controlling which beam of the cell to select by the wireless device. For example, the handover command may comprise some information to control which beam the wireless device selects during HO, such information may be a list of beams which are not suitable for access, or a radio link quality threshold for a beam to be selected by the wireless device. For example, measured link quality of a beam for selection should be better than that radio link quality threshold. The wireless device then selects a beam of the cell based on at least the beam indication.

It is furthermore herein disclosed a method performed by the first radio network node, also referred to as network node, for handling communication of the wireless device in the wireless communication network. The first radio network node serves the wireless device and the wireless communication network further comprises the second radio network node. The radio network node transmits the handover command to the wireless device indicating a handover to a cell served by the second radio network node. The handover command further comprises the beam indication controlling which beam of the cell to select by the wireless device.

Furthermore, a first radio network node and a wireless device configured to perform the methods herein are also provided.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) node etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Antenna node: As used herein, an "antenna node" is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication of the wireless device in a wireless communication network, wherein a first radio network node serves the wireless device and the wireless communication network, the wireless communication network having a second radio network node; the method comprising:
receiving a handover command from the first radio network node, the handover command indicating a handover to a cell served by the second radio network node, the handover command including a beam indication indicating which beam of the cell to select by the wireless device; and
selecting a beam of the cell based on at least the beam indication, wherein the beam indication includes a list of beams which are not suitable for access based on load, at least an indication of a contention-free resource, and a threshold indicating a threshold for a beam quality for a beam to be selected by the wireless device.

2. The method according to claim 1, wherein selecting a beam of the cell based on at least the beam indication comprises:
measuring a beam quality of at least the beam associated with the contention-free resource; and
prioritizing said beam associated with the contention-free resource when the measured beam quality is better than said beam quality threshold.

3. A computer-readable storage medium, having stored thereon a computer program product comprising instructions which, when executed on at least one processor, cause the at least one processor to carry out the method according to claim 1.

4. The method according to claim 1, wherein the threshold is further defined as indicating a threshold for a beam quality or a beam strength for a beam to be selected by the wireless device.

5. A method performed by a first radio network node for handling communication of a wireless device in a wireless communication network, wherein the first radio network node serves the wireless device and the wireless communication network, the wireless communication network including a second radio network node, the method comprising:
transmitting a handover command to the wireless device, the handover command indicating a handover to a cell served by the second radio network node, wherein the handover command includes a beam indication indicating which beam of the cell to select by the wireless device, wherein the beam indication includes a list of beams which are not suitable for access based on load, and a threshold indicating a threshold for a beam quality or a beam strength for a beam to be selected by the wireless device.

6. The method according to claim 5, wherein the beam indication comprises at least an indication of a contention-free resource and a beam quality threshold.

7. A wireless device for handling communication of the wireless device in a wireless communication network, wherein a first radio network node is configured to serve the wireless device and the wireless communication network, the wireless communication network having a second radio network node; wherein the wireless device is configured to:
receive a handover command from the first radio network node, the handover command indicating a handover to a cell served by the second radio network node, wherein the handover command including a beam indication indicating which beam of the cell to select by the wireless device; and to
select a beam of the cell based on at least the beam indication, wherein the beam indication includes a list of beams which are not suitable for access based on load, and a threshold indicating a threshold for a beam quality or a beam strength for a beam to be selected by the wireless device.

8. The wireless device according to claim 7, wherein the beam indication indicates an offset value, which offset value is a threshold value that a beam, configured with a contention based random access procedure, needs to outperform a beam, configured with a contention free random access procedure, with to be selected.

9. The wireless device according to claim 7, wherein the beam indication comprises at least an indication of a contention-free resource and a beam quality threshold.

10. The wireless device according to claim 9, wherein the wireless device is configured to select a beam of the cell based on at least the beam indication by measuring a beam quality of at least the beam associated with the contention-free resource; and, prioritizing said beam associated with the contention-free resource when the measured beam quality is better than said beam quality threshold.

11. A first radio network node for handling communication of a wireless device in a wireless communication network, wherein the first radio network node is configured to serve the wireless device and the wireless communication network, the wireless communication network having a second radio network node, wherein the first radio network node is configured to transmit a handover command to the wireless device, the handover command indicating a handover to a cell served by the second radio network node, wherein the handover command includes a beam indication indicating which beam of the cell to select by the wireless device, wherein the beam indication includes a list of beams which are not suitable for access based on load, and a threshold indicating a threshold for a beam quality or a beam strength for a beam to be selected by the wireless device.

12. The first radio network node according to claim 11, wherein the beam indication indicates an offset value, which offset value is a threshold value that a beam, configured with a contention based random access procedure, needs to outperform a beam, configured with a contention free random access procedure, with to be selected.

13. The first radio network node according to claim 11, wherein the beam indication comprises at least an indication of a contention-free resource and a beam quality threshold.

\* \* \* \* \*